(12) United States Patent
Hoynash

(10) Patent No.: US 9,334,111 B2
(45) Date of Patent: May 10, 2016

(54) HIGH DENSITY STORAGE ARRAY SYSTEM

(71) Applicant: Datalogic Automation, Inc., Telford, PA (US)

(72) Inventor: Peter Hoynash, Perkiomenville, PA (US)

(73) Assignee: Datalogic Automation, Inc., Telford, PA (US)

( * ) Notice: Subject to any disclaimer, the term of this patent is extended or adjusted under 35 U.S.C. 154(b) by 0 days.

(21) Appl. No.: 14/282,731

(22) Filed: May 20, 2014

(65) Prior Publication Data

US 2014/0346008 A1    Nov. 27, 2014

Related U.S. Application Data

(60) Provisional application No. 61/825,584, filed on May 21, 2013.

(51) Int. Cl.
| | |
|---|---|
| *B65G 1/04* | (2006.01) |
| *B65G 47/54* | (2006.01) |
| *B65G 1/02* | (2006.01) |
| *B65G 47/82* | (2006.01) |
| *B65G 13/02* | (2006.01) |

(Continued)

(52) U.S. Cl.
CPC *B65G 1/04* (2013.01); *B65G 1/026* (2013.01); *B65G 1/0478* (2013.01); *B65G 13/02* (2013.01); *B65G 47/54* (2013.01); *B65G 47/82* (2013.01); *B65G 1/1376* (2013.01); *B65G 37/02* (2013.01)

(58) Field of Classification Search
CPC ...... B65G 1/023; B65G 1/026; B65G 1/0478; B65G 1/1376; B65G 1/04; B65G 47/54

USPC .................................................. 198/347.1
See application file for complete search history.

(56) References Cited

U.S. PATENT DOCUMENTS

| | | | | |
|---|---|---|---|---|
| 2,096,958 A | * | 10/1937 | Clerc | 414/276 |
| 3,752,339 A | * | 8/1973 | Sullivan et al. | 414/807 |
| 4,658,947 A | * | 4/1987 | Welder | 198/346.2 |

(Continued)

FOREIGN PATENT DOCUMENTS

| | | |
|---|---|---|
| EP | 0438667 | 7/1991 |
| WO | 2009/089159 | 7/2009 |

OTHER PUBLICATIONS

Combined Search and Examination Report for UK Application No. GB1408982.5 dated Sep. 30, 2014.

(Continued)

*Primary Examiner* — Mark A Deuble
(74) *Attorney, Agent, or Firm* — Nelson Mullins Riley & Scarborough, LLP

(57) ABSTRACT

A conveyor system including a rack having a first level with an input conveyor being moveable with respect to the rack in a first direction of travel, a first storage conveyor being moveable with respect to the rack in a second direction of travel, a second storage conveyor being moveable with respect to the rack in a third direction of travel, and a cross transfer assembly being movable with respect to the input conveyor in both the second direction of travel and the third direction of travel so that the cross transfer assembly moves the object from the input conveyor onto one of the first storage conveyor and the second storage conveyor. The second direction of travel and the third direction of travel are transverse to the first direction of travel.

24 Claims, 21 Drawing Sheets

(51) Int. Cl.
*B65G 1/137* (2006.01)
*B65G 37/02* (2006.01)

(56) References Cited

U.S. PATENT DOCUMENTS

| | | | | |
|---|---|---|---|---|
| 5,478,183 A | * | 12/1995 | Savigny | 414/276 |
| 5,699,892 A | * | 12/1997 | Shyr et al. | 198/370.09 |
| 5,971,132 A | * | 10/1999 | Bonnet | 198/370.07 |
| 2005/0126885 A1 | * | 6/2005 | Brown et al. | 198/370.1 |
| 2005/0186053 A1 | * | 8/2005 | Itoh | 414/285 |
| 2007/0051585 A1 | * | 3/2007 | Scott et al. | 198/370.07 |
| 2010/0300842 A1 | * | 12/2010 | Bastian et al. | 198/586 |
| 2014/0262684 A1 | * | 9/2014 | Skanse et al. | 198/369.6 |
| 2014/0277700 A1 | * | 9/2014 | Maglaty | 700/230 |

OTHER PUBLICATIONS

Response to Combined Search and Examination Report for UK Application No. GB1408982.5, dated Sep. 30, 2014.

* cited by examiner

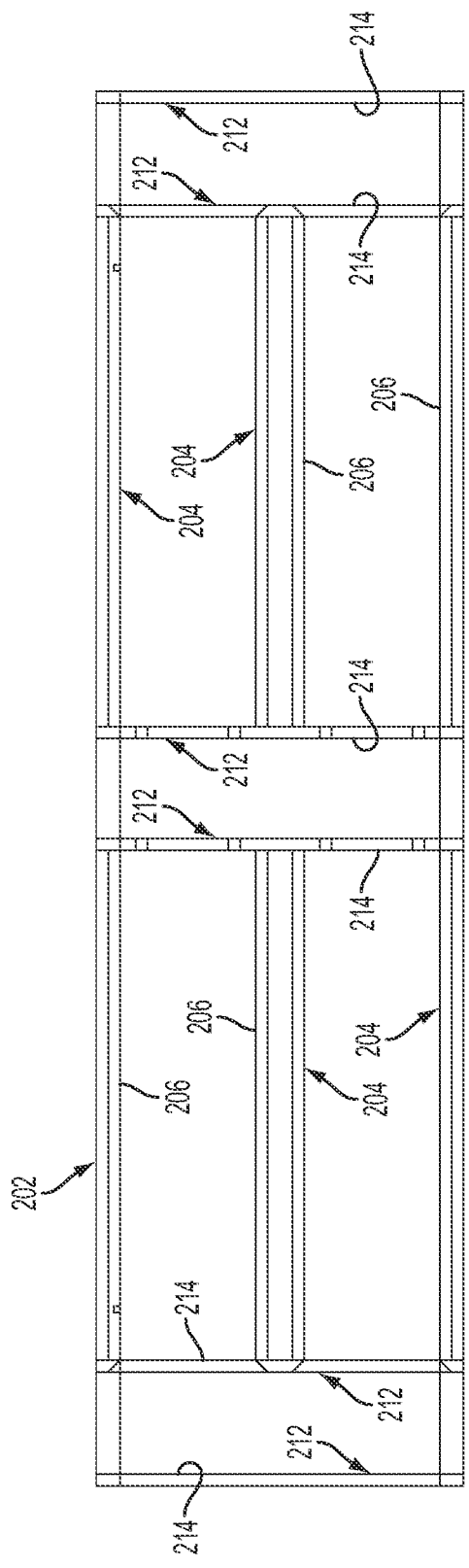
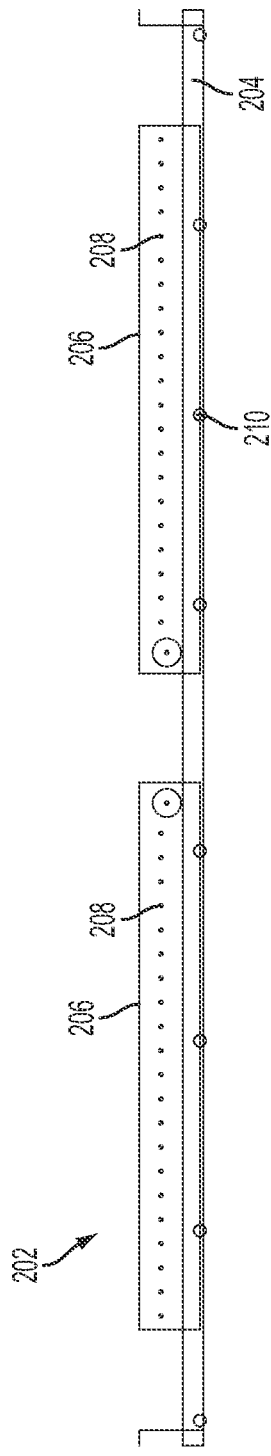
FIG. 5A
FIG. 5B

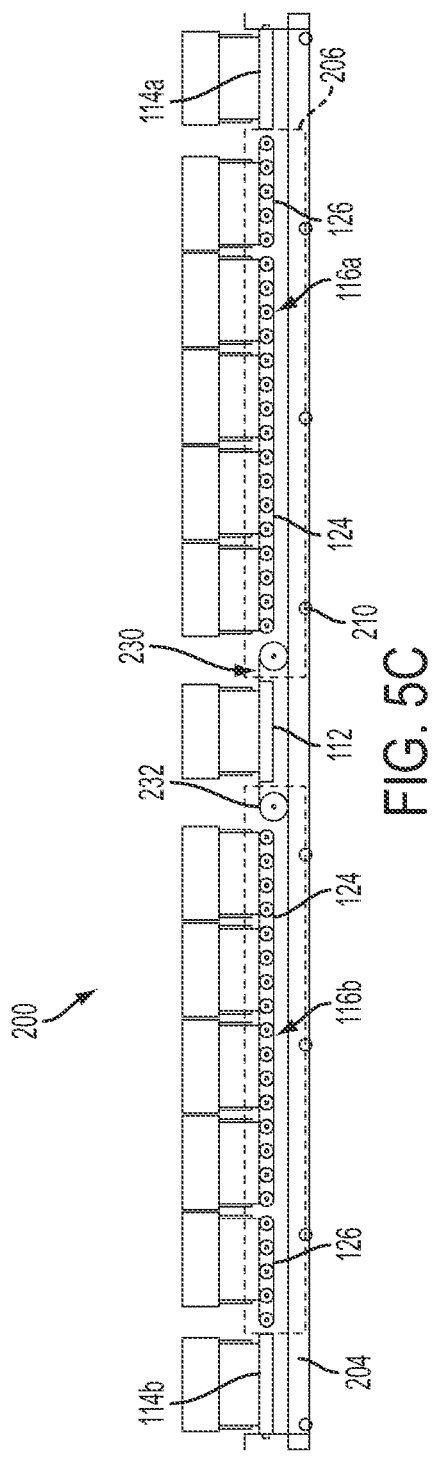

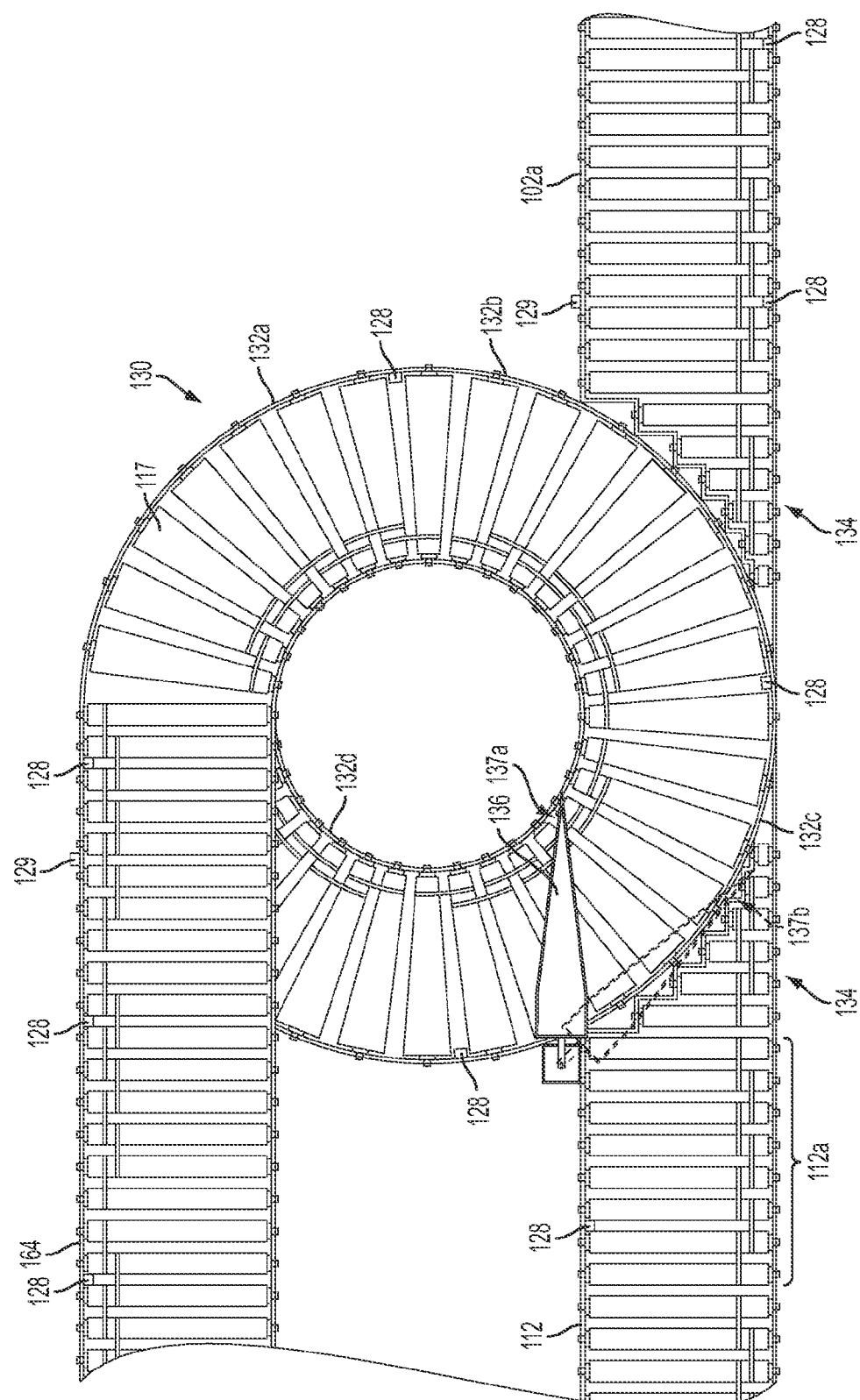

HIGH DENSITY STORAGE ARRAY SYSTEM

CLAIM OF PRIORITY

This application claims priority to U.S. Provisional Patent Application No. 61/825,584 filed May 21, 2013, the entire disclosure of which is hereby incorporated by reference herein.

FIELD OF THE INVENTION

The present invention relates generally to high speed sorting conveyor systems. More particularly, the present invention relates to automated storage and retrieval systems used with sorting conveyor systems.

BACKGROUND

Sorting conveyor systems 10 (FIG. 15) are known in the art to facilitate handling objects in settings such as warehouses, retail distribution centers, postal facilities, etc. These systems typically include a high speed main conveyor 12 that connects the individual stations where various functions are performed on the objects. In addition to an import station 22 where the objects are initially received and a dispatch station 14 where the objects are sent when shipped to the desired location, an exemplary sorting conveyor system may include a processing station 16, sorting station 18, storage station 20, etc. Typically, main conveyor 12 can handle many more objects than the conveyor systems present at the individual stations, as would be expected. For example, known sorting conveyors used by the United States Postal Service have main conveyors 12 that can handle 200 mail trays per minute, or more, whereas the existing pick and place automated storage and retrieval systems (ASRS) 20 for temporarily storing the trays may only be able to handle the storage and retrieval of as few as three trays per minute. The limiting factor for the number of trays the existing ASRSs can handle is generally the inability of the system's robot to place or retrieve multiple objects simultaneously. As such, multiple ASRSs are typically required to help prevent backing up trays on the main conveyor as they wait to be stored.

Additionally, known cross transfers that are used to move objects from one conveyor transversely to another conveyor at their intersection are known to cause issues with reliable conveyance. More specifically, one known type of cross transfer uses pluralities of rotating belts that are disposed between and below rollers of a conveyor. When it is desired to move an object from the initial conveyor to a subsequent conveyor, the belt assembly is raised above the rollers of the initial conveyor where they frictionally engage the bottom surface of the object being transferred. In those instances where the bottom surface is not flat or the object has uneven weight distribution, the object may become skewed as each belt of the cross transfer does not equally engage and, therefore, propel the object. As expected, skewing of the conveyed objects can lead to reduced operating speeds and even jamming of the conveyors.

The present invention recognizes and addresses considerations of prior art constructions and methods.

SUMMARY

One embodiment of a conveyor system for an object in accordance with the present disclosure includes a rack having a first level, an input conveyor disposed on the first level and being moveable with respect to the rack in a first direction of travel, a first storage conveyor disposed on the first level and being moveable with respect to the rack in a second direction of travel, a second storage conveyor disposed on the first level and being moveable with respect to the rack in a third direction of travel, and a cross transfer assembly disposed on the first level and being movable with respect to the input conveyor in both the second direction of travel and the third direction of travel so that the cross transfer assembly moves the object from the input conveyor onto one of the first storage conveyor and the second storage conveyor. The input conveyor is disposed between the first storage conveyor and the second storage conveyor and the second direction of travel and the third direction of travel are transverse to the first direction of travel.

Another embodiment of a conveyor system for an object in accordance with the present disclosure includes a rack having a first level and a second level, both the first level and the second level including an input conveyor being moveable with respect to the rack in a direction of travel that is parallel to a longitudinal center axis of the input conveyor, a first storage conveyor being moveable with respect to the rack in a direction of travel that is transverse to the longitudinal center axis of the input conveyor, a first output conveyor being moveable with respect to the rack in a direction of travel that is parallel to the longitudinal center axis of the input conveyor, and a cross transfer assembly being movable with respect to the input conveyor so that the cross transfer assembly moves an object from the input conveyor onto the first storage conveyor. The first level is disposed above the second level and for each level the first storage conveyor is disposed between the input conveyor and the first output conveyor.

Yet another embodiment of a conveyor system for an object in accordance with the present disclosure includes a first conveyor having a pair of adjacent first rollers for moving the object in a first direction of travel, a second conveyor having a first belt and at least one projection fixed to an outer surface of the first belt, the first belt being disposed between the first rollers so that an uppermost portion of the first belt is disposed below an uppermost portion of each first roller and the at least one projection extends upwardly beyond the uppermost portion of each first roller. The at least one projection is movable in a second direction of travel that is transverse to the first direction of travel.

Another embodiment of a conveyor system for an object in accordance with the present disclosure includes of a conveyor system for an object, comprising an input conveyor being moveable in a direction of travel that is parallel to a longitudinal center axis of the input conveyor, a first storage conveyor being moveable in a direction of travel that is transverse to the longitudinal center axis of the input conveyor, a first output conveyor being moveable in a direction of travel that is parallel to the longitudinal center axis of the input conveyor, and a cross transfer assembly being movable with respect to the input conveyor so that the cross transfer assembly moves an object from the input conveyor onto the first storage conveyor, wherein storage conveyor is disposed between the input conveyor and the first output conveyor.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which:

FIG. 5A is a plan view of a frame of the drawer assembly shown in FIG. 4;

FIG. 5B is a side elevational view of the drawer assembly frame shown in FIG. 5A;

FIG. 5C is a side elevational view of the drawer assembly shown in FIG. 4, showing a plurality of objects stored thereon;

FIG. 7 is a plan view of a spiral feed conveyor of the high density storage array system shown in FIG. 1;

Figure 1:
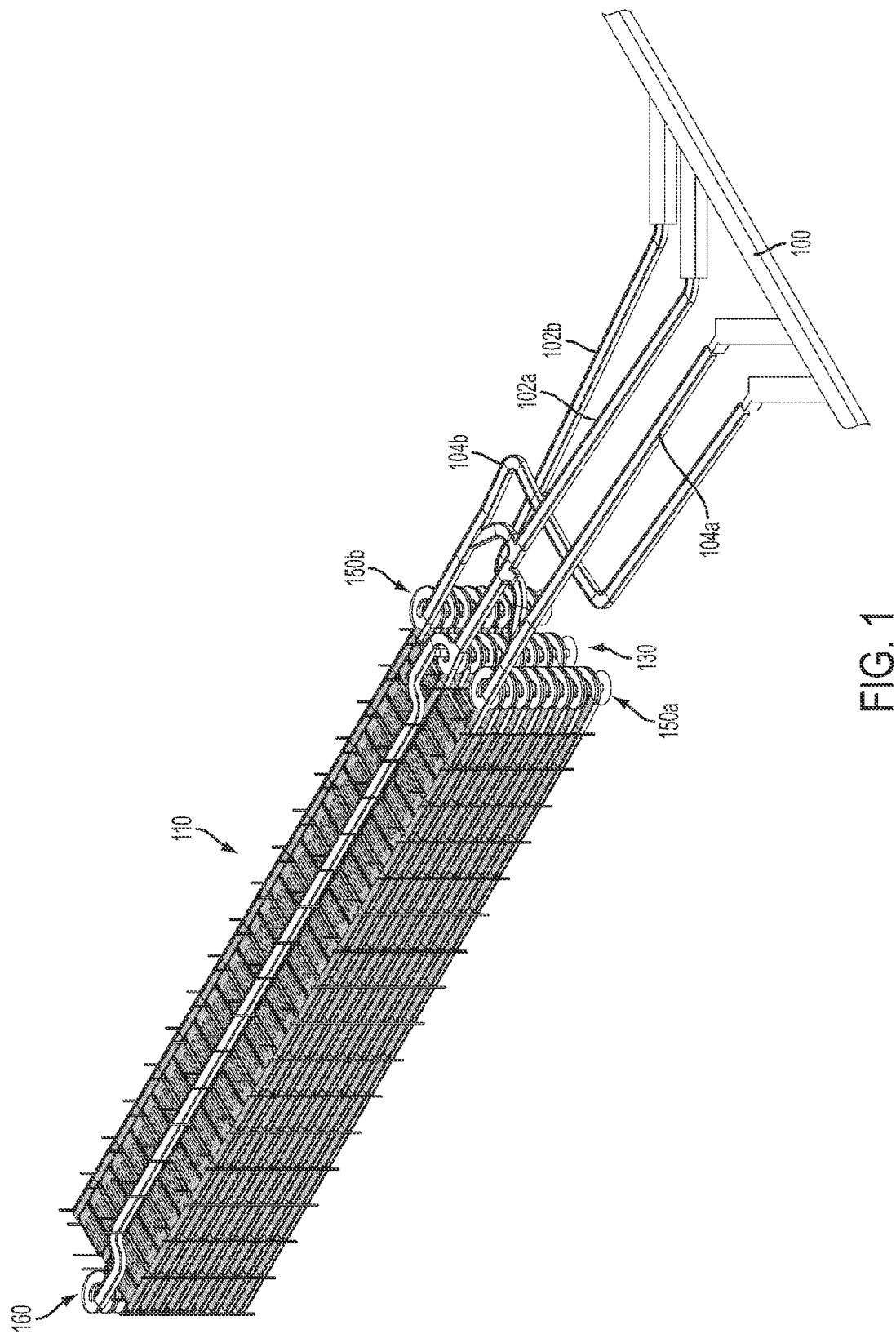
FIG. 1 is partial perspective view of a sorting conveyor system including an high density storage array system in accordance with an embodiment of the present disclosure.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents. Additional aspects and advantages of the invention will be set forth in part in the description which follows and, in part, will be obvious from the description, or may be learned from practice of the invention.

Figure 2:
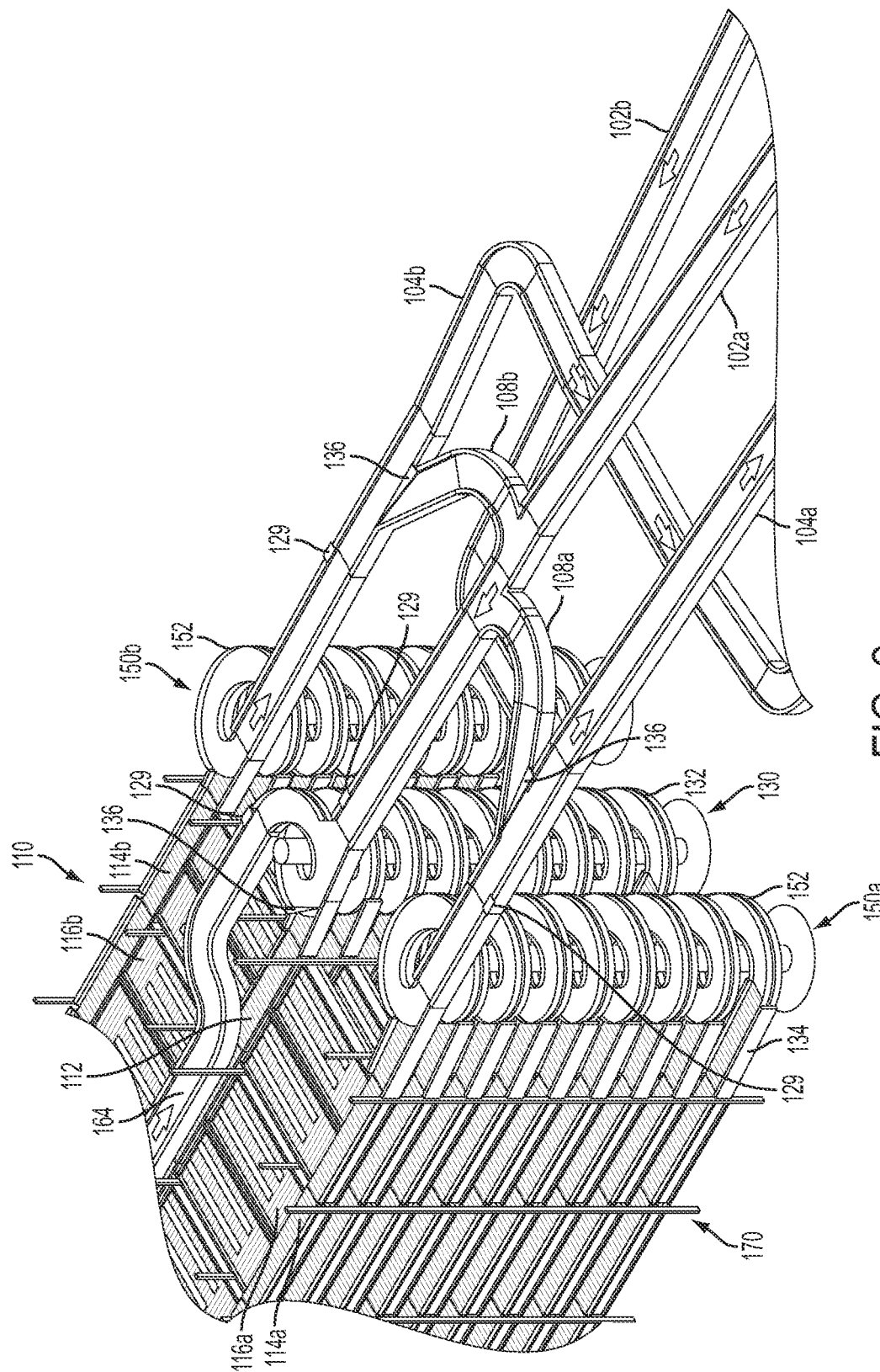
FIG. 2 is a partial perspective view of the high density storage array system shown in FIG. 1.

Referring now to the Figures, as shown in FIGS. 1 and 2, an embodiment of a high density storage array system (HDSAS) in accordance with the present disclosure is shown in use with a main conveyor 100 of a high speed sorting conveyor system. As shown, the HDSAS includes an accumulation array 110, a spiral feed conveyor 130, a spiral recirculation conveyor 160, and a pair of spiral output conveyors 150a and 150b. A pair of infeed conveyors 102a and 102b connect spiral feed conveyor 130 to main conveyor 100 of the sorting conveyor system. Referring also to FIG. 3B, infeed conveyor 102a and infeed conveyor 102b are connected to different rings 132 of spiral feed conveyor 130 to facilitate loading objects into accumulation array 110. For example, objects to be stored by the HDSAS can be fed onto spiral conveyor 130 using only one of infeed conveyors 102a and 102b, or they can be simultaneously fed onto spiral feed conveyor 130 by infeed conveyors 102a and 102b. Of course, when both infeed conveyors 102a and 102b are used simultaneously, the input rate of objects into spiral feed conveyor 130 and, therefore, accumulation array 110, is doubled as opposed to when just one is used. Note, however, infeed conveyor 102b may only store objects on the bottom five levels of the accumulation array 110, whereas infeed conveyor 102a may access each level. Additionally, the uppermost turn 132 of spiral feed conveyor 130 is connected to an uppermost turn 162 of spiral recirculation conveyor 160 by a recirculation conveyor 164 that extends along the top of accumulation array 110.

A pair of takeaway conveyors 104a and 104b similarly connect spiral output conveyors 150a and 150b to main conveyor 100. Each takeaway conveyor 104a and 104b is connected to the uppermost turn 152 of the corresponding spiral output conveyor 150a and 150b as well as with infeed conveyor 102a by a pair of respective cross-over conveyors 108a and 108b. Referring also to FIG. 3B, each of spiral feed conveyor 130, spiral recirculation conveyor 160, and spiral output conveyors 150a and 150b are in communication with each level of accumulation array 110. The presently discussed embodiment of the HDSAS includes spiral conveyors utilizing 24V motorized roller technology, manufactured by Carter Control Systems, Frederick, Md. 21702, although it should be understood that this is for purpose of illustration only and that other forms of conveyors could be used. For example, in alternate embodiments, the spiral feed conveyors may be omitted and multiple infeed conveyors may merge directly with corresponding levels of the accumulation array.

Referring specifically to FIG. 2, the HDSAS utilizes auto-identification equipment, such as, but not limited to, barcode scanners, cameras, etc., to retrieve information off of barcodes that are attached to the objects that are being conveyed. More specifically, a camera 129 is disposed at the intersection of each infeed conveyor 102a and 102b with spiral feed conveyor 130, the intersection of each spiral output conveyor 150a and 150b with the respective takeaway conveyor 104a and 104b, and the intersection of recirculation conveyor 164 with spiral feed conveyor 130. Additionally, diverters 136 are present where conveyors intersect and it maybe necessary to divert the conveyed objects onto one conveyor or the other, as discussed in greater detail below.

Figure 3A:
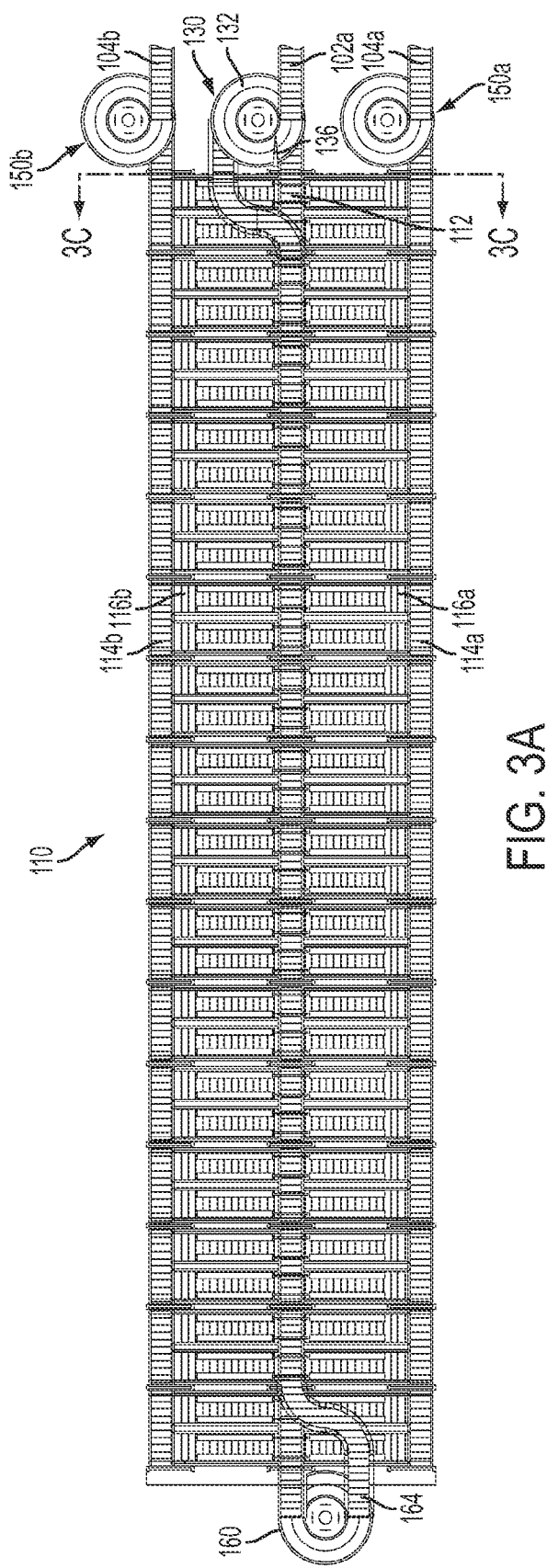
FIG. 3A is a plan view of the high density storage array system shown in FIG. 1.
Figure 3B:
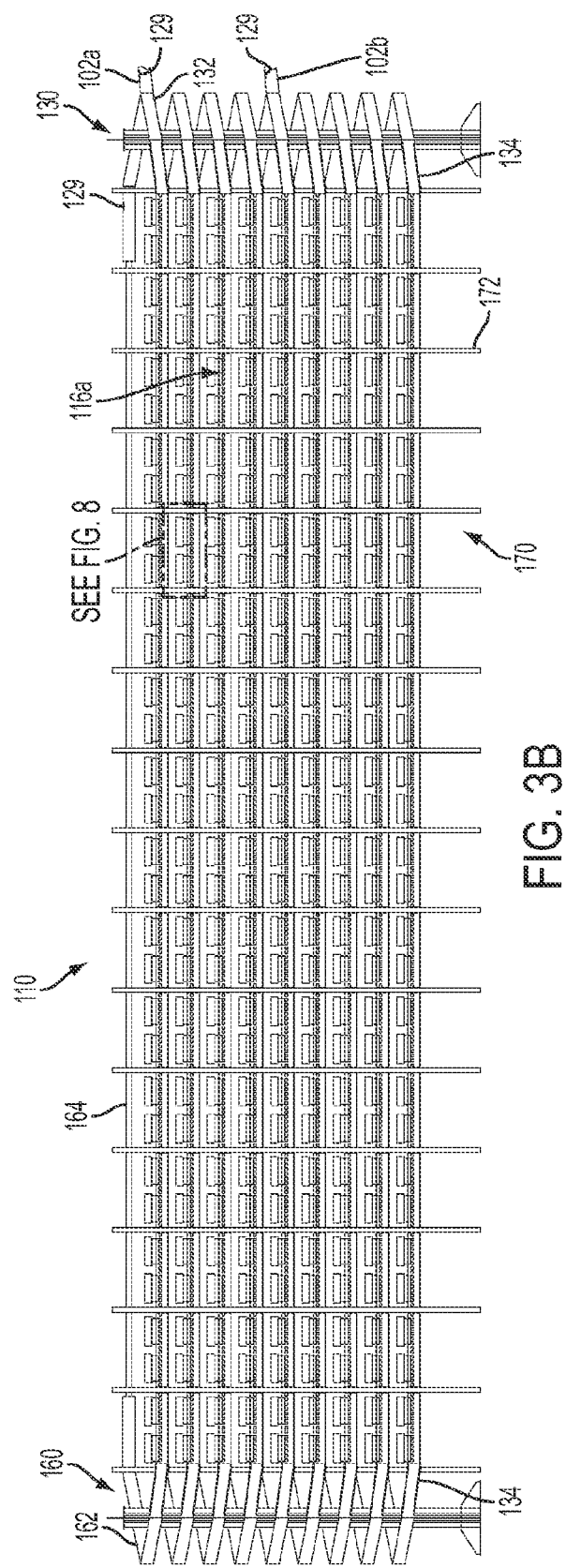
FIG. 3B is a left side elevational view of the high density storage array system shown in FIG. 1.
Figure 3C:
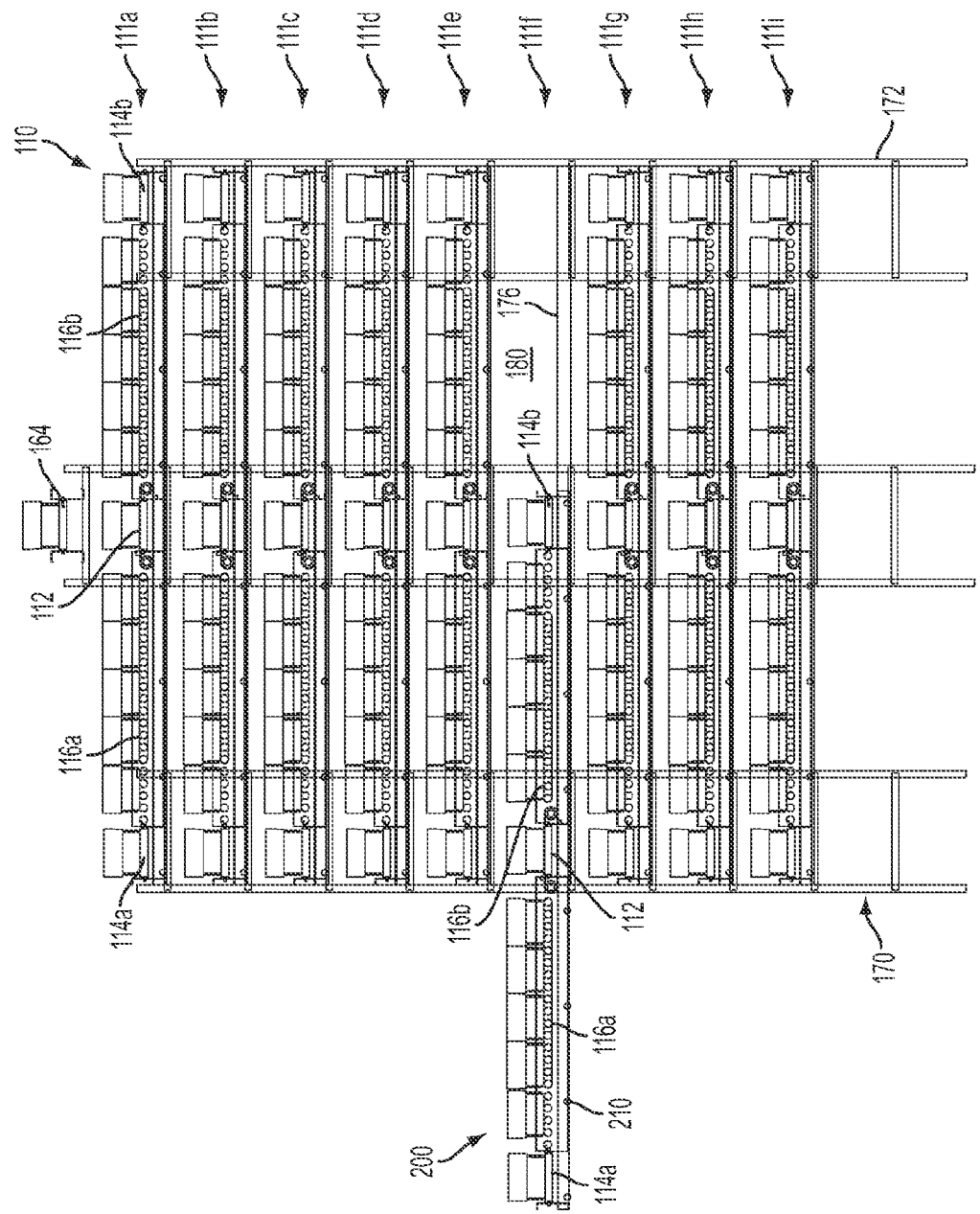
FIG. 3C is a front elevational view of the high density storage array system shown in FIG. 3A, taken along line 3C-3C.

Referring now to FIGS. 3A through 3C, each level 111a-111i of accumulation array 110 preferably includes an array input conveyor 112, a pair of storage conveyors 116a and 116b, and a pair of array output conveyors 114a and 114b. As best seen in FIG. 3A, each array input conveyor 112 extends along a longitudinal center axis of the corresponding level between spiral feed conveyor 130 and spiral recirculation conveyor 160. Array output conveyors 114a and 114b are disposed on opposite sides of array input conveyor 112 and are parallel to the longitudinal center axis of the level and in communication with spiral output conveyor 150a and 150b, respectively. Storage conveyors 116a and 116b of each pair extend outwardly from array input conveyor 112 to a corresponding array output conveyor 114a and 114b along a common lateral axis so that each storage conveyor 116a and 116b is perpendicular to both array input conveyor 112 and the corresponding array output conveyor 114a and 114b.

Figure 4:
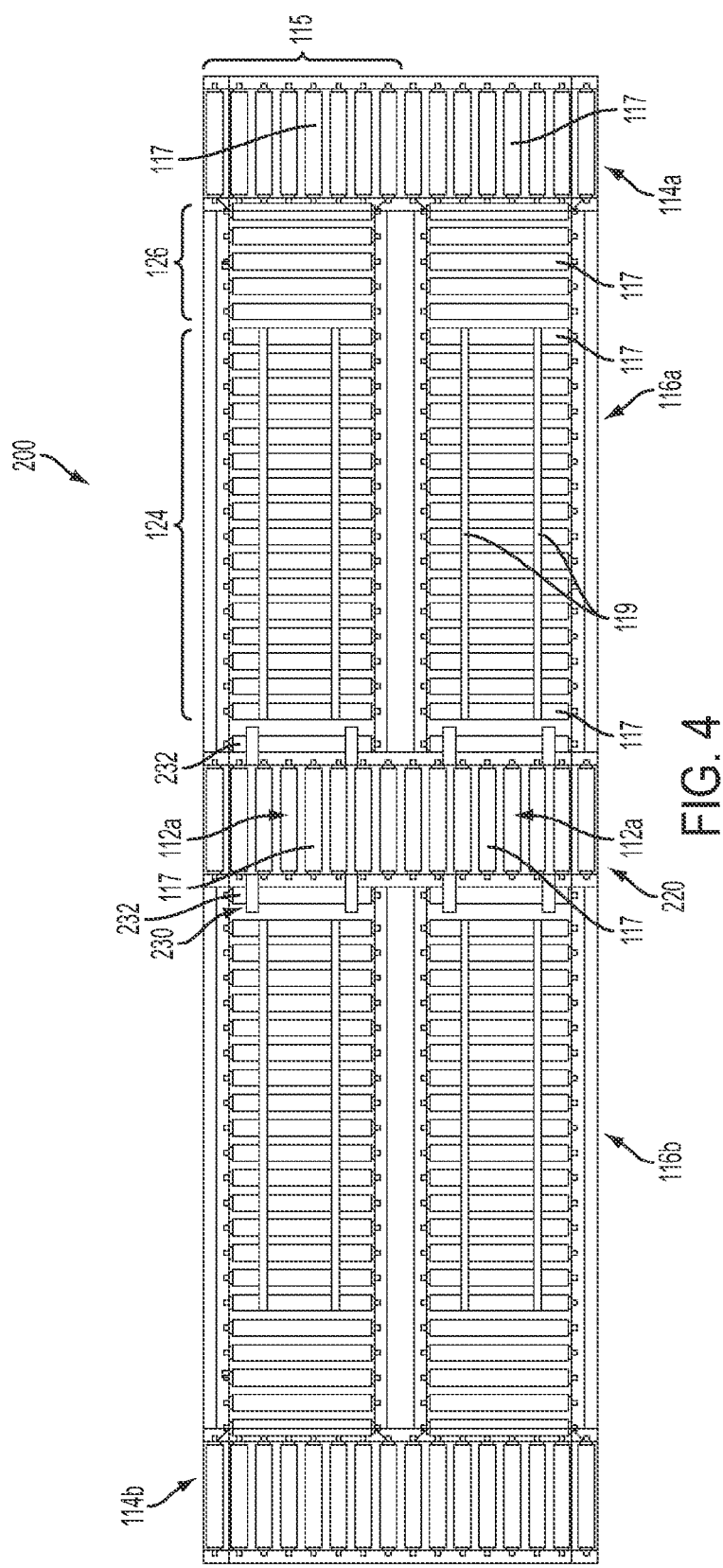
FIG. 4 is a plan view of a drawer assembly of the high density storage array system shown in FIG. 1.
Figure 6A:
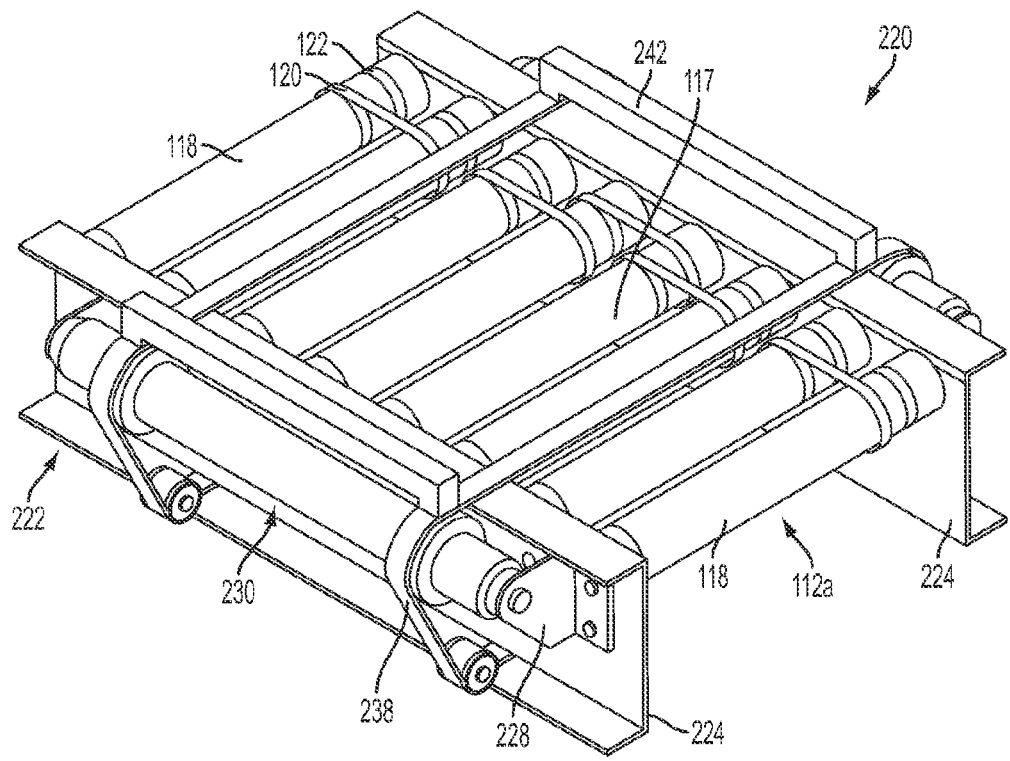
FIG. 6A is a perspective view of a cross transfer assembly of the high density storage array system shown in FIG. 1.

Referring additionally to FIG. 4, array input conveyor 112 is comprised of a plurality of array input conveyor zones 112a, each of which is a zone of a corresponding cross transfer assembly 220 (FIG. 6A), as discussed in greater detail below. Storage conveyors 116a and 116b of each pair are disposed on opposite sides of a corresponding cross transfer assembly 220. Similarly, array output conveyors 114a and 114b are each comprised of a plurality of array output conveyor zones 115, one array output conveyor zone 115 being disposed at the outermost end of a corresponding storage conveyor opposite a corresponding cross transfer assembly 220. The presently discussed embodiment of the HDSAS is designed specifically to be used with the standard sized trays used by the United States Postal Service (USPS), which are 26 inches in length, although it should be understood that this is for purpose of example only and that the system can be configured to accommodate other object sizes as desired. In this example embodiment, the length of each array input conveyor zone 112a and each array output conveyor zone 115 has been selected to be 30 inches to allow for adequate spacing between adjacent trays on the conveyors. Additionally, each array input conveyor zone 112a and each array output conveyor zone 115 includes a sensor (not shown), such as a photo eye sensor, for detecting whether or not a tray is present on the corresponding conveyor zone, as discussed in greater detail below. Note, however, these dimensions are specific only to the present embodiment and alternate embodiments may have different dimensions and conveyor arrangements as is necessary.

Still referring to FIG. 4, in the example embodiment shown, each level 111a-111i of accumulation array 110 is formed by a plurality of drawer assemblies 200 that are each slidably received in a corresponding cavity 180 (FIG. 8) defined by a rack (i.e. the framing) 170 (FIG. 3C) of accumulation array 110. Preferably, each drawer assembly 200 includes a pair of cross transfer assemblies 220, two pairs of storage conveyors 116a and 116b and four array output conveyor zones 115 supported by a frame 202 of drawer assembly 200, in the previously discussed configuration.

As shown in FIGS. 5A through 5C, frame 202 includes a plurality of transverse members 204 including upwardly extending flanges 206, each defining a plurality of apertures 208 along its length. Apertures 208 are configured to rotatably receive a plurality of drive rollers 117 (FIG. 4) and associated idler rollers 118 (FIG. 6A) of storage conveyors 116a and 116b. Additionally, each outermost transverse member 204 includes a plurality of wheels 210 disposed along the length of its bottom edge. Wheels 210 facilitate insertion and extraction of the drawer assemblies from the rack of accumulation array 110, as best seen in FIG. 3C. Three pairs of longitudinal members 212 are perpendicular to transverse members 204 and include flanges 214 extending upwardly therefrom. Each flange defines a plurality of apertures along its length that is configured to rotatably receive drive rollers 117 and idler rollers 118 of array input conveyor 112 and array output conveyors 114a and 114b. Preferably, each array input conveyor zone 112a and array output conveyor zone 115 includes one drive roller 117 and seven idler rollers 118 per portion. Each drive roller 117 drivingly engages idler rollers 118 through a plurality of roller belts 120 that are received in annular grooves 122 defined in the outer surfaces of adjacent rollers (similar to the arrangement shown in FIGS. 6A-6D, omitted here for clarity of the figures), as is known by those of ordinary skill in the art. Additionally, each array input conveyor zone 112a includes two pairs of drive transfer wheels 227 (FIG. 6D) to impart rotation on the outermost pairs idler rollers 118, as discussed in greater detail below. The driver rollers utilized in array input conveyor 112, array storage conveyors 116a and 116b, and array output conveyors 114a and 114b are 24V motorized power rollers available from Carter Control Systems, Frederick, Md. 21702.

Referring additionally to FIG. 4, each storage conveyor 116a and 116b includes a first portion 124 and a second portion 126. First portion 124 is disposed adjacent array input conveyor 112 and includes a pair of outer drive rollers 117 with a plurality of idler rollers disposed therebetween. Unlike the previously discussed conveyor portions, a pair of belts 119 extend between the outer drive rollers 117 and engage each idler roller 118 (FIG. 6A) disposed therebetween. As such, all rollers, as well as objects disposed thereon, of first portion 124 move in unison, as opposed to the array input and output conveyors in which the rollers of each portion are rotated independently of the other portions. Second portion 126 of each storage conveyor 116a and 116b includes a single drive roller 117 that drives four associated idler rollers 118 through a plurality of roller belts 120, as previously discussed. Second portion 126 of each storage conveyor 116a and 116b is operated independently of the associated first portion 124 and is utilized to facilitate offloading objects from the corresponding storage conveyor 116a and 116b onto the corresponding array output conveyor 114a and 114b, respectively.

As shown in FIGS. 3B and 3C, rack 170 of accumulation array 110 includes a plurality of vertical members 172 that are affixed to a plurality of longitudinally extending horizontal members 174 and a plurality of transversely extending horizontal members 176. The height of each of levels 111a-111i of accumulation array 110 is determined by the vertical spacing between adjacent horizontal members of the array.

Figure 8:
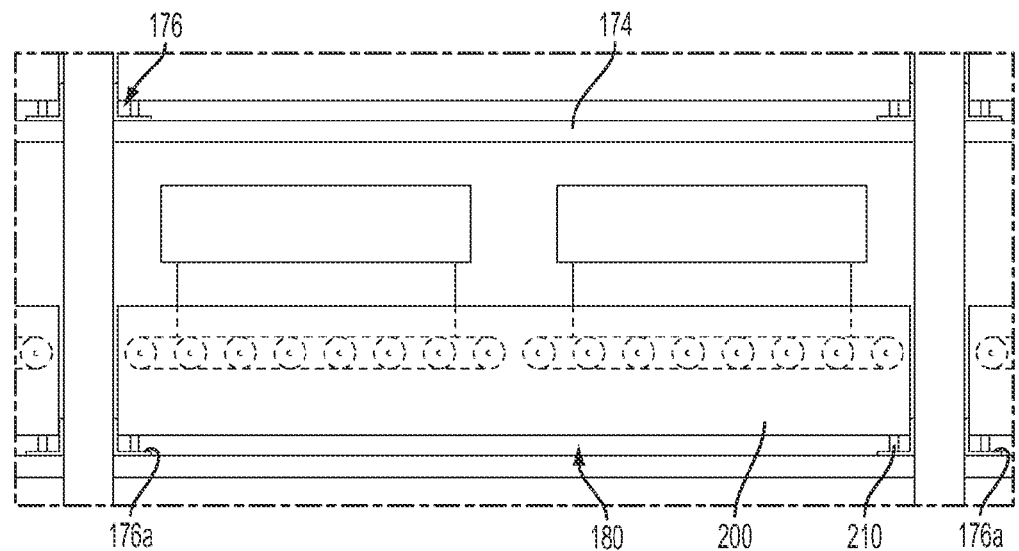
FIG. 8 is a partial view of the high density storage array system shown in FIG. 3B.

Referring additionally to FIG. 8, when viewing accumulation array 110 from the side, each pair of adjacent vertical members 172 and associated adjacent longitudinal horizontal members 174 define a cavity 180 that is configured to slidably receive a corresponding drawer assembly 200 therein. Transverse horizontal members 176 are preferably angle brackets that extend across the full width of the accumulation array in corresponding pairs. As shown, each pair of angle brackets is affixed to the corresponding vertical members so that their lower flange portions 176a depend inwardly toward each other and are disposed in the same horizontal plane. In the embodiment shown, wheels 210 of each drawer assembly ride along lower flange portions 176a of the corresponding cavity 180 to facilitate insertion and removal of the drawer assembly within rack 170. The ability to slide each drawer assembly 200 out of rack 170 allows maintenance to be performed on that given drawer while the remaining levels of accumulation array 110 remain functional. For example, as shown in FIG. 3C, only level 111*f* of the array cannot be loaded and unloaded when its associated drawer assembly 200 is being repaired. As well, because drawer assemblies 200 can be pulled from rack 170 for maintenance from a position outside the rack, rather than requiring a technician to enter the rack to repair a damaged conveyor in place, it is unnecessary to provide space within the rack to accommodate human movement, and the distance between levels of the accumulation array can therefore be minimized. The proper positioning and prevention of inadvertent movement of each drawer assembly 200 relative to rack 170 is prevented by passing a lock bolt, or a similar structure, through lock apertures (not shown) defined by corresponding portions of drawer assembly frame 202 and rack 170.

Figure 6B:
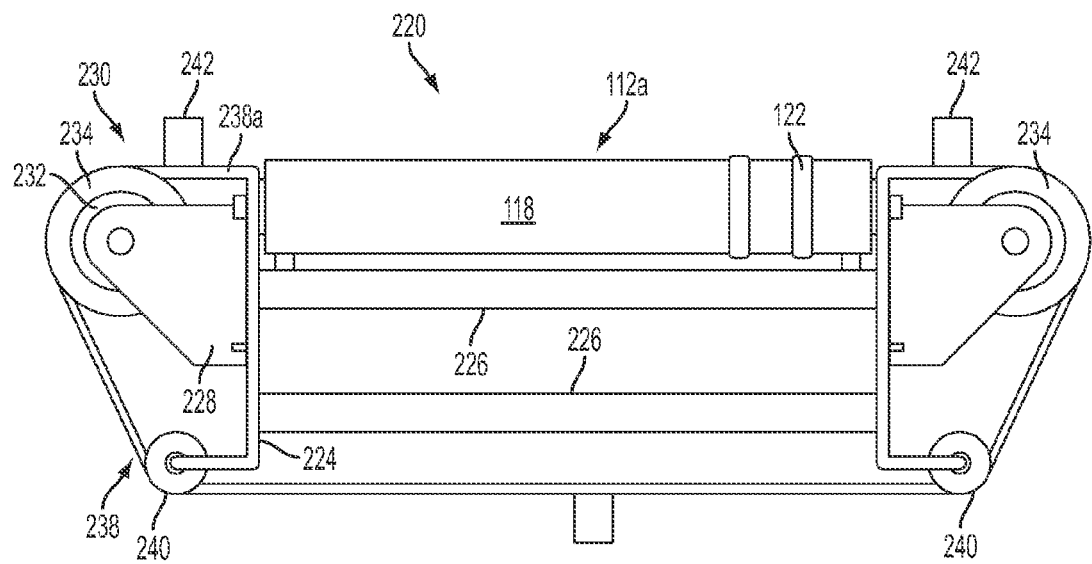
FIG. 6B is a front elevational view of the cross transfer assembly shown in FIG. 6A.
Figure 6C:
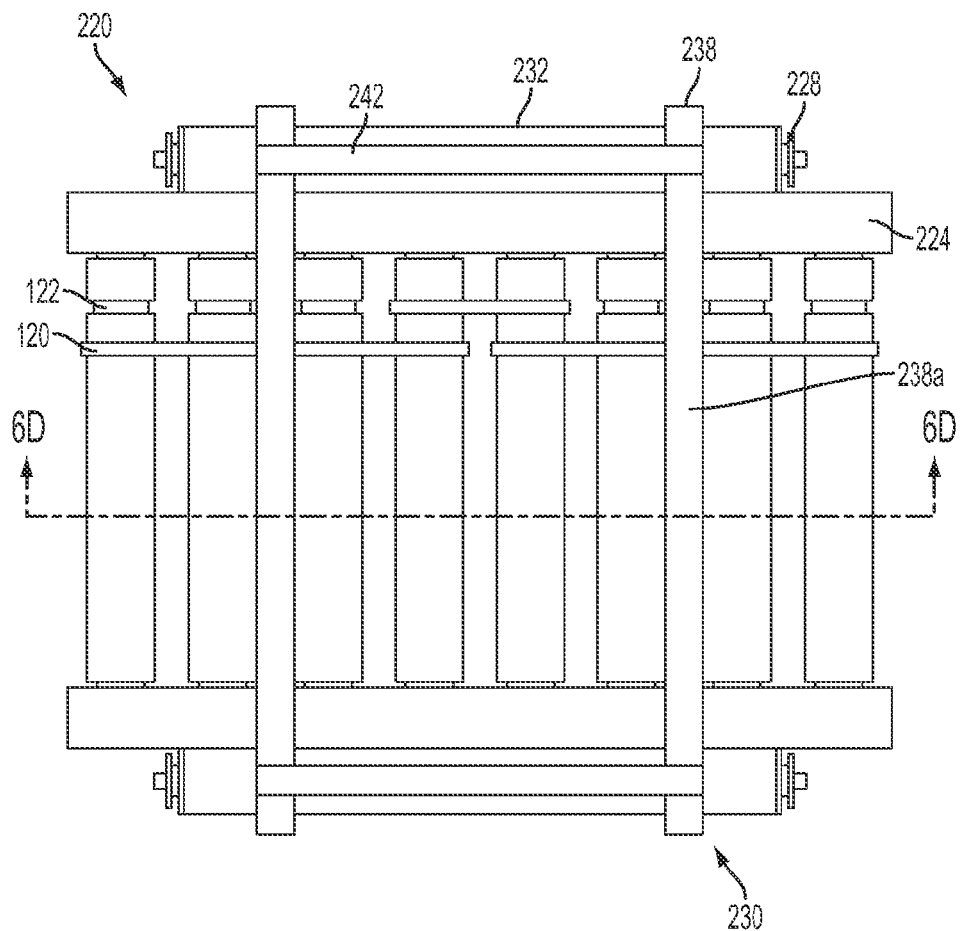
FIG. 6C is a top plan view of the cross transfer assembly shown in FIG. 6A.
Figure 6D:
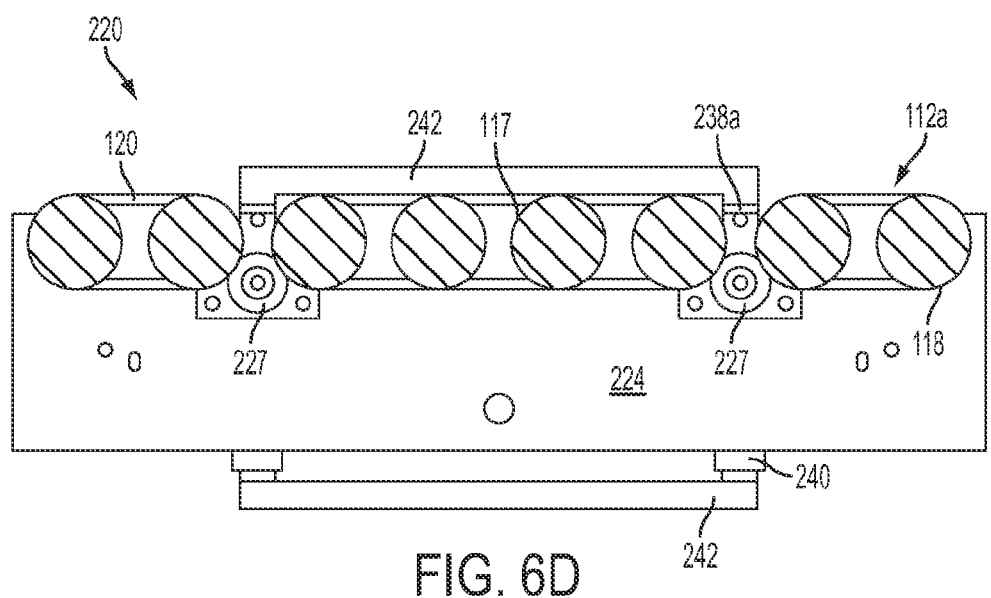
FIG. 6D is a cross-sectional view of the cross transfer assembly shown in FIG. 6C, taken along line 6D-6D.

Referring now to FIGS. 6A through 6D a cross transfer assembly 220 of array input conveyor 112 includes a frame 222, an array input conveyor zone 112*a* and a cross transfer 230. Frame 222 includes a pair of longitudinal members 224 and a plurality of transverse members 226 for providing rigidity to the frame. Each longitudinal frame member 224 defines a plurality of apertures that are configured to rotatably receive a drive roller 117 and associated idler rollers 118 of the associated array input conveyor zone 112*a*. In addition to utilizing a plurality of drive belts 120 engaging annular grooves 122 formed on the various rollers, drive roller 117 also utilizes two pairs of drive transfer wheels 227, each pair being mounted to an inner surface of a corresponding longitudinal frame member 224, as best seen in FIG. 6D. As shown, the rollers of array input conveyor zone 112*a* are divided into an inner group of four rollers and two outer groups of two rollers each, for reasons discussed in greater detail below. Note, no drive belts 120 are used to connect rollers of the inner group with rollers of the outer group so that drive roller 117, which is in the inner group of rollers, can impart motion on idler rollers 118 of the outer groups. However, each drive transfer wheel 227 engages an outermost idler roller 118 of the inner roller group and an innermost idler roller 118 of the adjacent outer roller group. As such, rotation of the outermost idler rollers of the inner group causes rotation of the drive transfer wheels 227 which, in turn, impart rotation on the innermost idler rollers of the outer roller groups.

As shown, cross transfer 230 preferably includes a pair of drive rollers 232, a pair of indexing belts 238 and a plurality of transfer bars 242. Each drive roller 232 is rotatably supported at its opposing ends by a pair of brackets 228 that is mounted to an outer surface of a corresponding frame member 224. Each drive roller 232 includes a toothed drive pulley 234 extending radially outward at each end. Each indexing belt 238 includes a correspondingly toothed inner surface that is engaged by corresponding drive pulleys 234 of the drive rollers 232. As best seen in FIGS. 6C and 6D, brackets 228 are mounted to frame 222 so that corresponding drive pulleys 234 of the opposed drive rollers 232 and, therefore, the indexing belts mounted thereon, are disposed between an outermost roller of the inner roller group and an innermost roller of the corresponding outer roller group. Additionally, as best seen in FIGS. 6B and 6D, drive rollers 232 are further positioned such that an uppermost portion 238*a* of each indexing belt 238 is disposed beneath a plane in which uppermost portions of the adjacent rollers lie. Because the indexing belts 238 are disposed below the uppermost portions of the adjacent rollers, drive transfer wheels 227 are utilized, rather than drive belts 120, to impart rotation on the rollers of the outer roller groups, as previously discussed. Further, each indexing belt 238 passes over a pair of idler pulleys 240 that are rotatably mounted to longitudinal frame members 224.

Figure 6E:
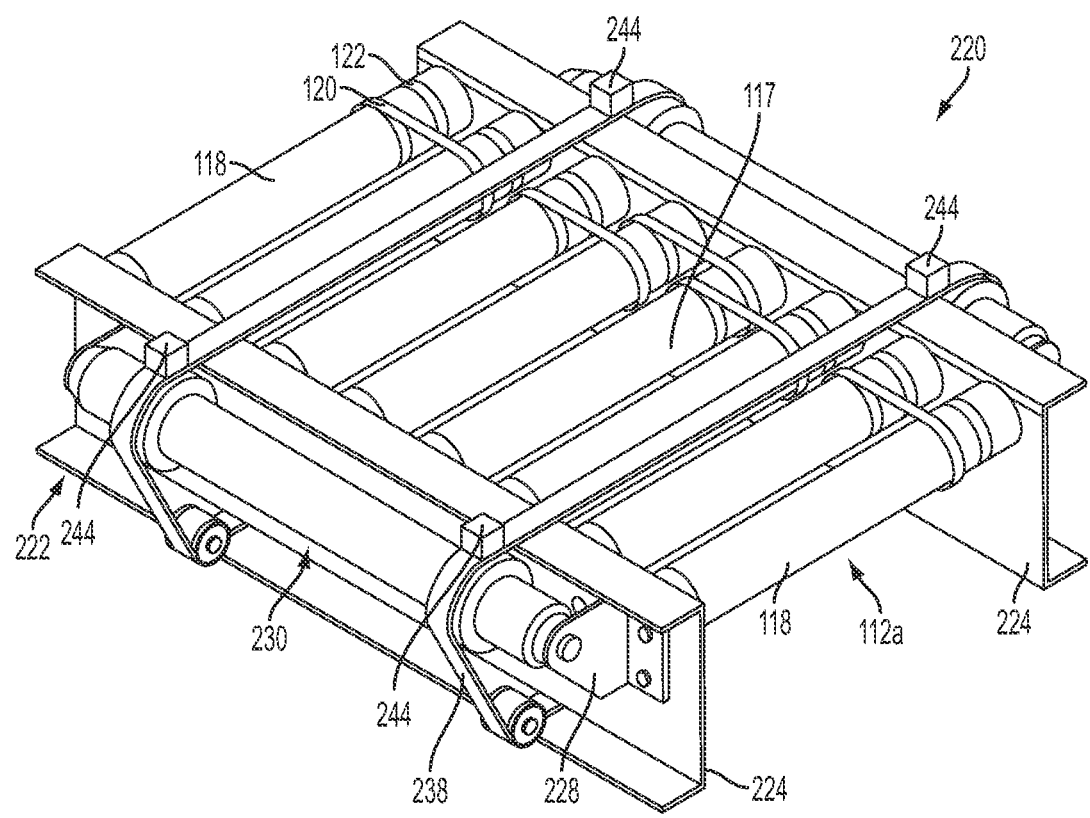
FIG. 6E is a perspective view of a alternate embodiment of a cross transfer assembly of the high density storage array system shown in FIG. 1.

As shown, each transfer bar 242 is affixed to both indexing belts 238 at its opposite ends, such that each transfer bar 242 is parallel to the longitudinal center axis of array input conveyor 112. Preferably, as best seen in FIG. 6B, the number and spacing of transfer bars 242 on indexing belts 238 is such that in an at-rest position, transfer bars 242*a* and 242*b* are positioned on each side of array input conveyor 112 so that a conveyed tray is receivable therebetween. So positioned, indexing belts 238 are rotatable in either the clockwise (CW) or counter-clockwise (CCW) direction thereby engaging the tray with either transfer bar 242*a* or transfer bar 242*b*, respectively. Continued rotation in the same direction causes either transfer bar 242*a* to slide the tray off of array input conveyor 112 and onto a corresponding storage conveyor. Upon completion of the tray's transfer, indexing belts 238 come to rest such that two of the three transfer bars 242 are once again properly positioned for the next transfer event. Note, the positioning of transfer bars 242 parallel to the longitudinal center axis of array input conveyor 112 helps insure that as the transfer bar engages the flat side of the tray to be moved, the tray will remain properly aligned and not become skewed. As shown in FIG. 6E, an alternate embodiment of cross transfer 230 includes pairs of lugs 244 affixed to indexing belts 238 rather than transfer bars.

Referring now to FIG. 7, a top view of spiral feed conveyor 130 is discussed. As previously noted, recirculation conveyor 164 and infeed conveyors 102*a* and 102*b* are in communication with spiral feed conveyor 130, and spiral feed conveyor 130 is in communication with each level 111*a*-111*i* of accumulation array 110. As shown, where an end portion of a straight conveyor, such as array input conveyor 112 and infeed conveyors 102*a* and 102*b*, is in communication with a turn 132 of spiral feed conveyor 130, a merge portion 134 is disposed between the ring and the straight conveyor to facilitate the transfer of objects from one conveyor to the other. Note, recirculation conveyor 164 joins the uppermost turn 132 at its end and, as such, a merged portion is not required.

As shown, each turn 132 is comprised of four 90° zones 132*a*-132*d* that each includes one drive roller 138 and seven idler rollers 140. Similarly to the previously discussed roller conveyors, drive roller 138 imparts rotation of the associated idler rollers 140 through a plurality of roller belts 142 that connect adjacent pairs of rollers. As previously noted, at each point at which a tray may either continue to travel downwardly on spiral feed conveyor 130 or exit onto a desired level of accumulation array 110, such as the juncture with array input conveyor 112 of level 111*a* (FIG. 2), a diverter 136 is installed. Diverter 136 is a blocking element that is pivotably movable between a first position 137*a*, in which further travel down spiral feed conveyor 138 is prevented so that an object will therefore exit onto array input conveyor 112, and a second position 137*b*, in which access to array input conveyor 112 is blocked so that the object, therefore, continues down the spiral feed 130.

Conveyance of an object on each turn zone 132*a*-132*d* is controlled independently of the remaining zones. For example, as with the conveyor zones of both the array input conveyor 112 and array output conveyors 114*a* and 114*b*, each turn zone 132*a*-132*d* includes a photo eye 128 that is configured to detect a presence or absence of an object on that turn zone. Where an object is already present on a turn zone 132, as determined by the associated photo eye sensor, a programmable logic controller (PLC) prevents the adjacent upstream turn zone from becoming activated. As such, the PLC prevents objects being conveyed by spiral feed conveyor 130 from contacting each other, thereby preventing objects from potentially causing a jam and loss of spacing on the conveyor and adversely affecting operation of the HDSAS.

Figure 9:
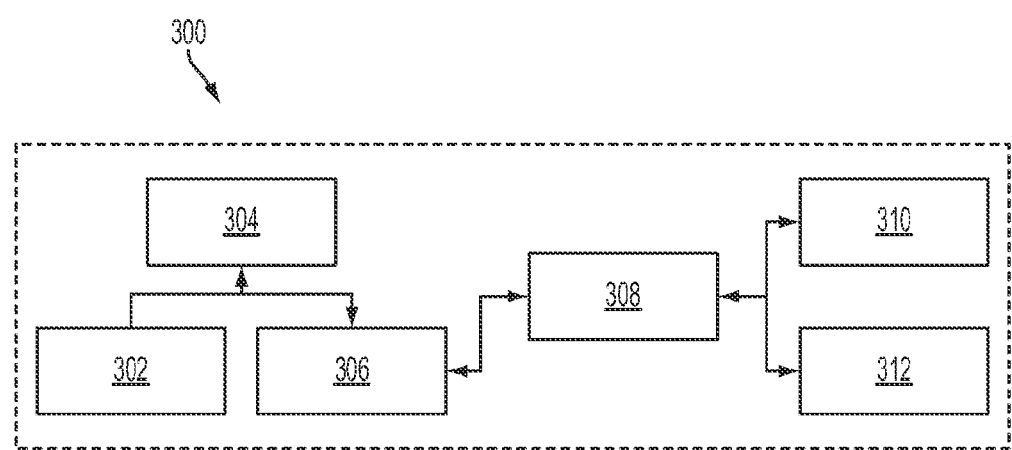
FIG. 9 is a schematic illustration of the system architecture of the high density storage array system shown in FIG. 1.

Referring again to FIGS. 1 and 2, and additionally to FIG. 9, movement of an object (in this example, a standard size tray as used by the USPS) within a sorting conveyor system 300 of the present disclosure is discussed. Initially, as each tray enters sorting system 300, it is received in a scanning zone 302. Each tray has an identifier associated with it, such as a UPC code, or barcode, in the instant case, that is read by the system. The host computer system 304 receives the information associated with each barcode and retains the information (such as a zip code associated with the mail in a particular tray) in a database for later use in routing the trays through the sorting system. In the present example, host computer system 304 determines a location within accumulation array 110 where the tray is to be stored, as well as a secondary location should the primary location not be available upon the tray's arrival. Specifically, based on information previously provided by the HDSAS PLC 306 as to which storage locations within accumulation array 110 are occupied and which are vacant, the host computer system 304 is able to determine storage locations within the array that facilitate the eventual off-loading of the trays. Note, however, grouping of the trays by zip code, and therefore their ultimate delivery destination, is merely an example used for description purposes. It should be understood that the storage location algorithm utilized by the host computer system 304 can be varied as desired and that the scanning zone may include its own controller, such as a computer or a PLC, or it may be controlled by the host computer system 304 directly.

The host computer system 304 determines whether or not there are trays presently stored in accumulation array 110 that are to be delivered to the same zip code as the tray to be stored. If so, the host computer system 304 determines their location in the array and whether or not there is a vacant storage location available on the same storage conveyor as those trays. If storage space is available, the host computer system 304 will select that storage conveyor for the tray. If not, as determined by the HDSAS PLC 306 and input from the photo eye sensors throughout the array, the host computer system 304 may select a vacant storage space that is in close proximity to the full storage conveyor. From there, the tray moves along main conveyor 100 of the sorting system until reaching infeed conveyors 102a and 102b, at which point the tray is diverted onto one of the infeed conveyors dependent upon the storage location within accumulation array 110.

In the present example, the tray is to be stored on level 111c on the fifth storage conveyor from spiral feed conveyor 130, as indicated by reference numeral 116a in FIG. 3B. As such, the tray is diverted from main conveyor 100 onto infeed conveyor 102a and eventually deposited on turn zone 132b of spiral feed conveyor 130. Similar to the previously discussed array input conveyors 112 and array output conveyors 114a and 114b, infeed conveyors 102a and 102b are comprised of a plurality of independently operated conveyor zones.

Prior to depositing the tray on turn zone 132b, the HDSAS PLC 306 determines whether or not there is already a tray present on turn zone 132b through information provided by the photo eye that is associated with the final zone of infeed conveyors 102a. If there is, the tray will remain on the last zone of infeed conveyor 102a until the preceding tray is cleared from turn zone 132b. Additionally, prior to being positioned on spiral feed conveyor 130, camera 129 positioned on infeed conveyor 102a reads the barcode on the tray which identifies the package and allows the HDSAS PLC 306 to inform the host computer system 304 of the tray's arrival at spiral feed conveyor 130. Information regarding the desired storage location is then provided by the host computer system 304 to the HDSAS PLC 306 which controls operation of the required conveyor zones and diverters 136 within the accumulation array. The host computer system 304 and HDSAS PLC 306 are networked together with the various system inputs and outputs 310/312, such as conveyor zone motors, diverter motors, cross transfer motors, etc., by, for example, Ethernet connections. One of skill in the art should understand that Ethernet is a local-area network (LAN) architecture that uses a bus or star topology and supports data transfer rates of 10 Mbps. Ethernet uses the CSMA/CD access method or other LAN standard to handle simultaneous demands. A version of Ethernet, called 100Base-T (or Fast Ethernet), supports data transfer rates of 100 Mbps, and Gigabit Ethernet supports data rates of 1 gigabit (1,000 megabits) per second. The Ethernet connection is given by way of example only, with other means of connectivity being possible as necessary.

Prior to the tray being moved from turn zone 132b to turn zone 132c, the HDSAS PLC 306 positions diverter 136 in the appropriate position. More specifically, if the tray is to be stored on level 111a, diverter 136 is placed in its first position 137a. However, if the tray is to be stored on any other level 111b-111i of accumulation array 110, diverter 136 is moved to its second position 137b so that the tray continues to be moved downwardly by spiral feed conveyor 130 to the appropriate level. As previously noted, the tray is to be stored on level 111c and, as such, HDSAS PLC 306 places diverter 136 in second position 137b, and spiral feed conveyor 130 moves the tray downwardly until reaching turn zone 132b of the turn that is adjacent level 111c. At this point, the HDSAS PLC 306 determines the desired position for the diverter that is adjacent to array input conveyor 112 of level 111c, that being its first position 137a. As such, after the diverter is positioned, the tray is moved onto turn zone 132c and subsequently onto the first array input conveyor zone 112a of level 111c by the HDSAS PLC 306. The tray is moved to subsequent array input conveyor zones until reaching the fifth one, which is adjacent the desired fifth storage conveyor 116a.

Referring now to FIG. 4, for ease of description, the assumption is made that the uppermost storage conveyor 116a is the desired storage location for the tray. Upon being received on array input conveyor zone 112a that is adjacent the desired storage conveyor 116a, the HDSAS PLC 306 determines the appropriate direction in which the tray must be moved in order to be placed on the appropriate storage conveyor 116a or 116b. Referring additionally to FIGS. 6A through 6D, in the present example, the HDSAS PLC 306 rotates indexing belts of cross transfer assembly 220 such that the transfer bar in its at-rest position adjacent the left hand side of array input conveyor 112 passes over array input conveyor zone 112a until it arrives at its at-rest position on the right-hand side of array input conveyor 112. In so doing, the transfer bar engages the tray and slides the tray off of array input conveyor 112 and onto first portion 124 of storage conveyor 116a.

If the tray is the first one to be received on storage conveyor 116a, first portion 124 of storage conveyor 116a is rotated only long enough to fully remove the tray from array input conveyor 112. In this manner, and due to the fact that all rollers of first portion 124 rotate in unison, each subsequent tray that is received on storage conveyor 116a can be positioned thereon with minimal clearance between it and the preceding tray. As such, storage space on each storage conveyor is maximized. The HDSAS PLC 306 informs the host computer system 304 when the tray has been positioned in the designated storage location and the host computer system 304 updates its database of tray locations accordingly.

Note, in the case that the tray reaches the intended storage conveyor, but the HDSAS PLC 306 determines that the intended storage conveyor happens to be full based on input from the photo eyes associated with the zones of the storage conveyor, the HDSAS PLC 306 will move the tray along to a secondary, or possibly tertiary, storage location that was provided by the host computer system 304 prior to the tray entering spiral feed conveyor 130. The HDSAS PLC 306 keeps track of the status (full/empty) of each storage space in the accumulation array through input from the photo eyes of the array. However, in those cases that none of the desired storage locations are available, the HDSAS PLC 306 moves the tray along the remainder of array input conveyor 112 where it is offloaded onto spiral recirculation conveyor 160. Next, the tray is offloaded onto the recirculation conveyor 164 where it is transported back to the uppermost ring of spiral input conveyor 130, where the host computer system 304 may assign the tray a different storage location.

To offload the tray from storage conveyor 116a, the tray is conveyed from first portion 124 to second portion 126 of storage conveyor 116a, provided there is not already a tray on second portion 126. Second portion 126 is then activated to position the tray on the adjacent array output conveyor 114a, at which point the tray is moved from zone to zone of the array output conveyor until reaching spiral output conveyor 150a (FIG. 2). If, however, the HDSAS PLC 306 determines a tray is present on second portion 126 of storage conveyor 116a, it offloads that tray onto array output conveyor 114a prior to offloading the desired tray onto array output conveyor 114a. In this case, both trays are moved from zone to zone of array output conveyor 114a, in the manner previously discussed, until reaching spiral output conveyor 158. Note, as trays are moved throughout accumulation array 110, input from the photo eyes associated with each conveyor zone allows the HDSAS PLC 306 to continuously update which storage locations are vacant and which are occupied. The HDSAS PLC 306 provides this information to the host computer system 304 for use in determining where the individual trays are to be stored within the array.

As noted, for the desired tray to be placed on main conveyor 100, both it and the tray preceding it in storage conveyor 116a are removed from accumulation array 110. Both trays proceed upwardly along spiral output conveyor 150a in the manner previously discussed regarding spiral feed conveyor 130, with the exception that no diverters are encountered. As best seen in FIG. 2, upon exiting spiral output conveyor 150a, camera 129 reads the barcode of the preceding tray and the HDSAS PLC 306 provides this information to the host computer system 304 which determines that it is not the tray that is to be offloaded onto main conveyor. As such, a diverter 136 at the intersection of takeaway conveyor 104a and cross-over conveyor 108 is positioned by the host computer system 304 so that the preceding tray is guided onto crossover conveyor 108. Crossover conveyor 108 feeds into infeed conveyor 102a so that the tray maybe re-circulated back into its proper storage position within accumulation array 110, in the same manner previously discussed. Similarly, camera 129 reads the barcode of the desired tray upon the tray being deposited on takeaway conveyor 104a. After determining that the tray is the one to be offloaded onto main conveyor 100, the host computer system repositions diverter 136 so that the tray is allowed to travel along takeaway conveyor until it is ultimately deposited on main conveyor 100. The host computer system 304 updates its database to reflect that the desired tray is no longer stored in the array. In this manner, the host computer system 304 is able to maintain a database of which trays are in which storage locations of accumulation array 110 on a constant basis.

Figure 10:
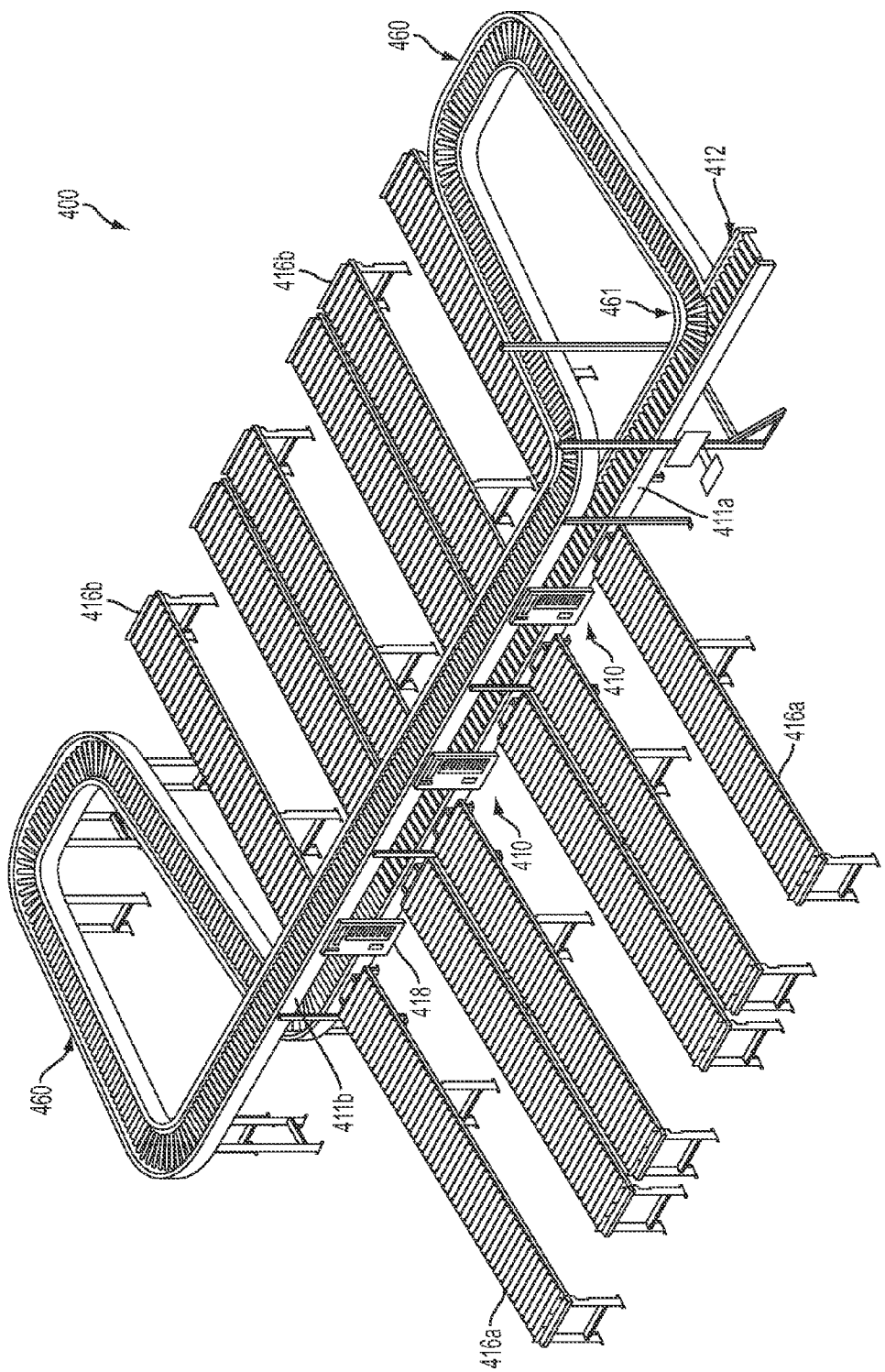
FIG. 10 is a perspective view of a modular sorter station of the sorting conveyor system shown in FIG. 1.
Figure 11:
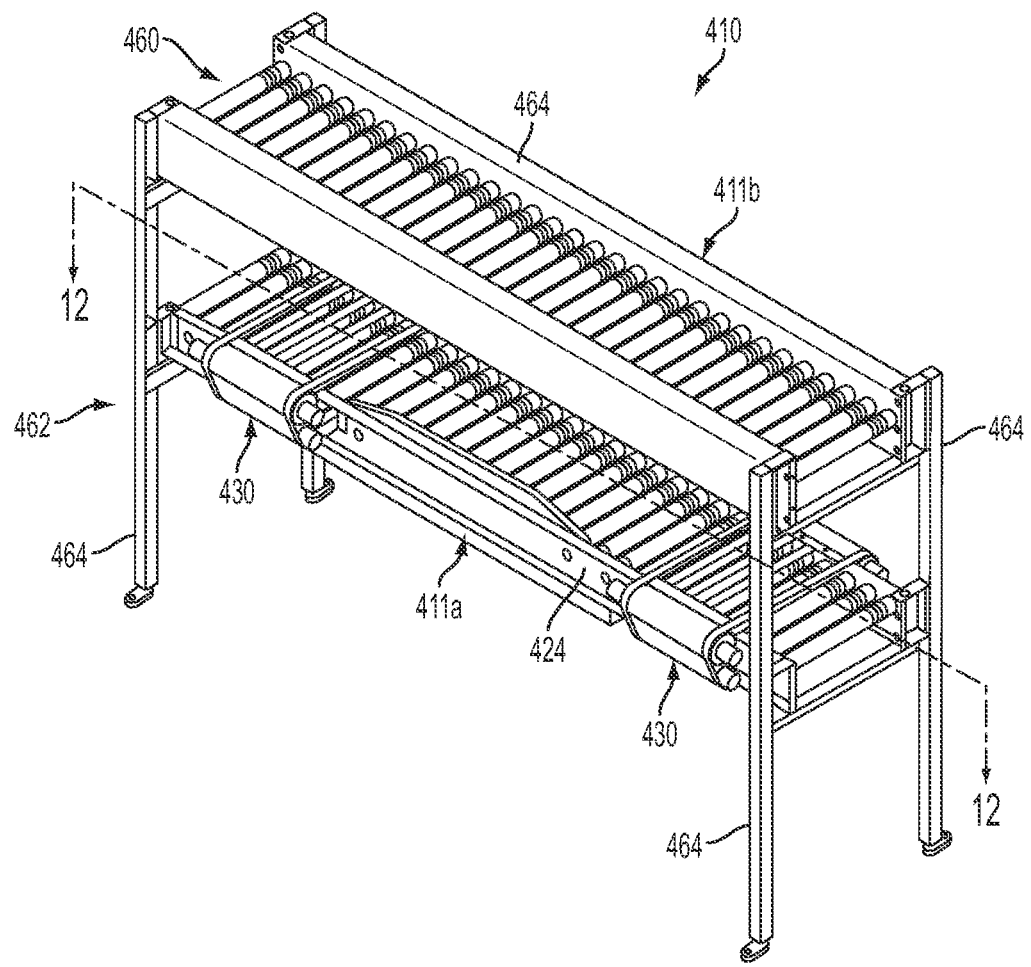
FIG. 11 is a perspective view of a single sorter module of the modular sorter station shown in FIG. 10.

Referring now to the Figures, as shown in FIGS. 10 and 11, an embodiment of a modular sorter station 400 in accordance with the present disclosure is shown in use with an infeed line 412 of the high speed sorting conveyor system. As shown, the modular sorter station 400 includes a first level 411a having a sorter line formed by a plurality of sorter line zones 412, multiple module output conveyors 416a, 416b, and a recirculation conveyor 460 that forms a second level 411b. Infeed line 412 extends to modular sorter station 400 from main conveyor 100 (FIG. 1) of the high speed sorting conveyor system and is used to load objects thereon. A camera (not shown) is disposed at the intersection of recirculation conveyor 460 and first level 411a of modular sorter station 400.

Figure 12:
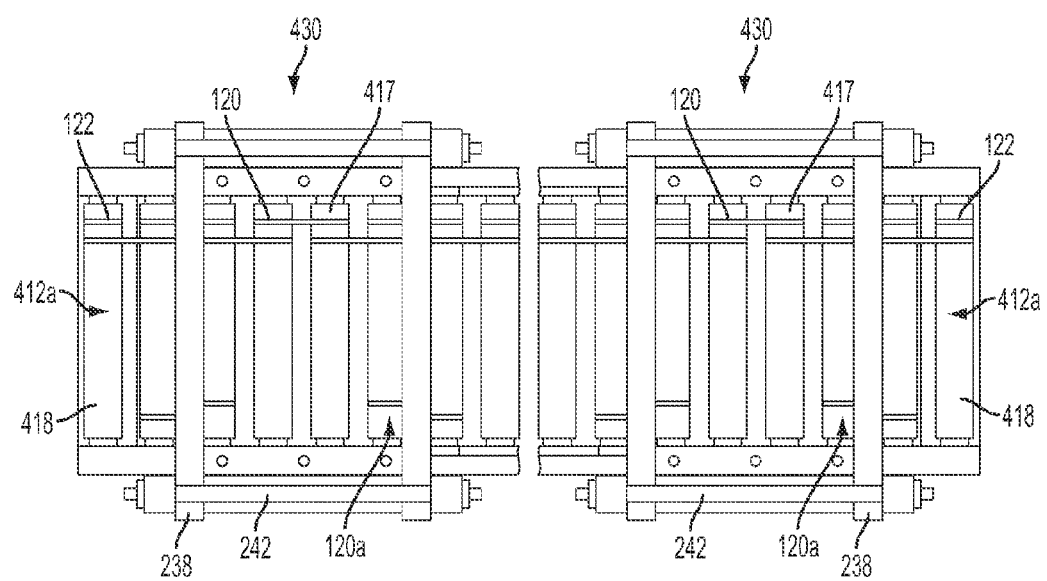
FIG. 12 is a broken plan view of the bottom level of the sorter module shown in FIG. 11
Figure 14A:
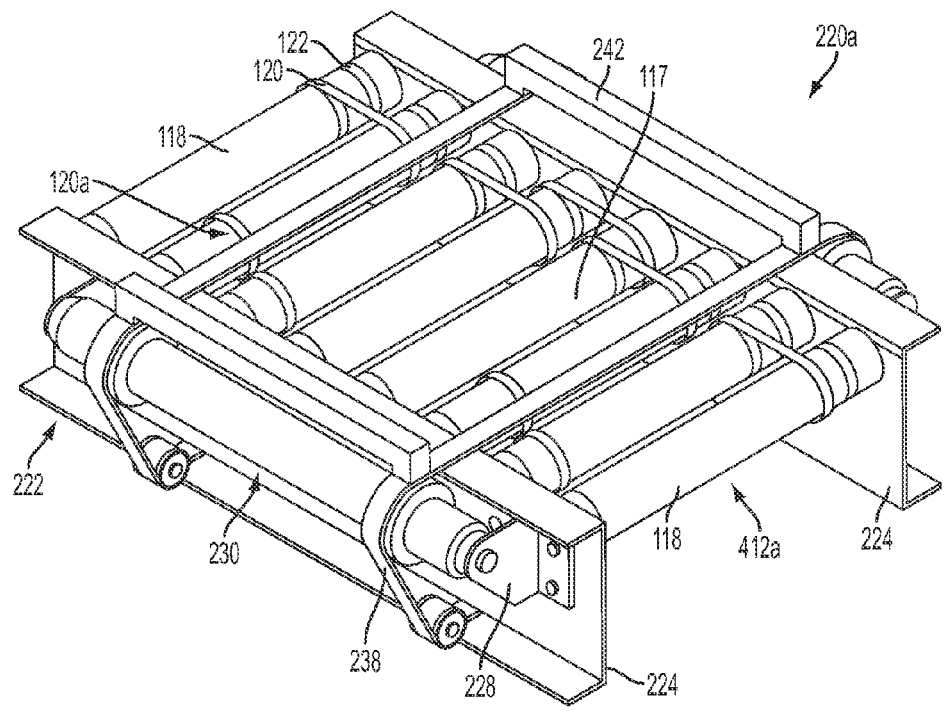
FIG. 14A is a perspective view of a cross transfer assembly of the modular sorter station shown in FIG. 10.

Referring additionally to FIGS. 11 and 12, modular sorter station 400 includes one or more sorter modules 410, there being three in the present embodiment, each sorter module 410 preferably including a first level 411a with four sorter line zones 412a. Only the outermost pair of sorter line zones 412a are shown in FIG. 12, the inner two zones being omitted for clarity. Each of the outermost sorter line zones 412a is a zone of a corresponding cross transfer assembly 430 (FIG. 14A), as discussed in greater detail below. Module output conveyors 416a and 416b are disposed on opposite sides of a corresponding cross transfer assembly 430, recirculation conveyor 460 forms a second level 411b of each sorter module 410, and a control panel 418 (FIG. 10) is provided including contacts for all electrically driven parts (motors, motor drivers, alarms, etc.) and an embedded controller (not shown) so that each sorter module may operate independently of the other modules.

Preferably, each sorter line zone 412a includes one drive roller 117 and seven idler rollers 118 per portion. Each drive roller 117 drivingly engages idler rollers 118 through a first plurality of roller belts 120 that are received in annular grooves 122 defined in the outer surfaces of adjacent rollers, as shown in FIGS. 14A-14D. Additionally, each sorter line zone 412a includes two pairs of second drive belts 120a (FIG. 14D) to impart rotation on the outermost pairs idler rollers 118, as discussed in greater detail below. The driver rollers utilized in sorter line zones 412a and recirculation conveyor 460 are 24V motorized power rollers available from Interroll, Wilmington, N.C. Module output conveyors 416a, 416b are each preferably comprised of a plurality of idler rollers, but in alternate embodiments powered rollers, such as those previously discussed, may be used as well.

The presently discussed embodiment of modular sorter station 400 is designed specifically to be used with the standard sized trays used by the United States Postal Service (USPS), which are 26 inches in length, although it should be understood that this is for purpose of example only and that the system can be configured to accommodate other object sizes as desired. In this example embodiment, the length of each sorter line zone 412a has been selected to be 30 inches to allow for adequate spacing between adjacent trays on the conveyors. Additionally, each sorter line zone 412a includes a sensor (not shown), such as a photo eye sensor, for detecting whether or not a tray is present on the corresponding conveyor zone, as discussed in greater detail below. Note, however, these dimensions are specific only to the present embodiment and alternate embodiments may have different dimensions and conveyor arrangements as is necessary.

As shown in FIG. 11, rack 462 of modular sorter station 400 includes a plurality of vertical members 464 that are affixed to longitudinally extending frame members 424 of cross transfer assemblies 430 and frame members 464 of recirculation conveyor 460. The height of first level 411*a* of modular sorter station 400 may be determined by the vertical spacing required by the objects being offloaded, or increased by simply utilizing longer vertical members 464. Note, control panel 418 is omitted from FIG. 12 to allow a better view of lower level 411*a*.

Figure 14B:
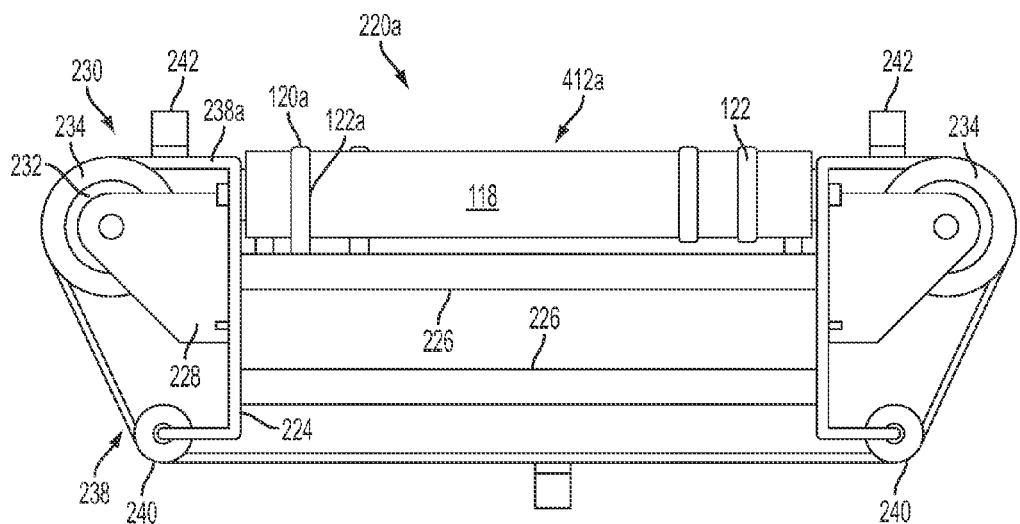
FIG. 14B is a front elevational view of the cross transfer assembly shown in FIG. 14A.
Figure 14C:
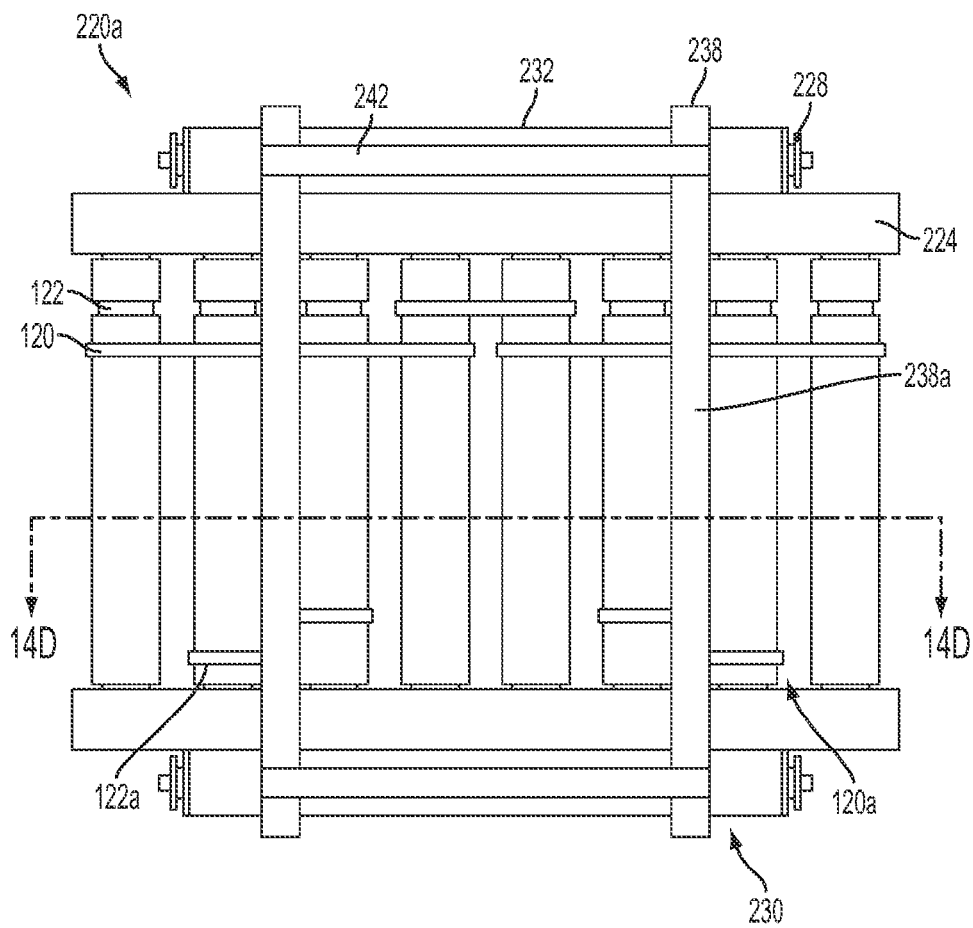
FIG. 14C is a top plan view of the cross transfer assembly shown in FIG. 14A.
Figure 14D:
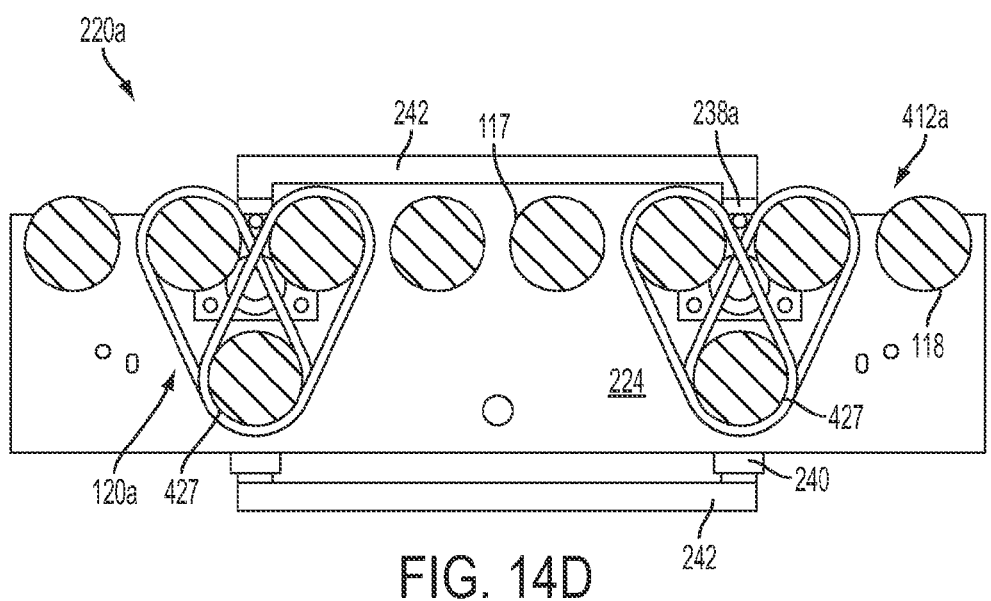
FIG. 14D is a cross-sectional view of the cross transfer assembly shown in FIG. 14C, taken along line 14D-14D.
Figure 15:
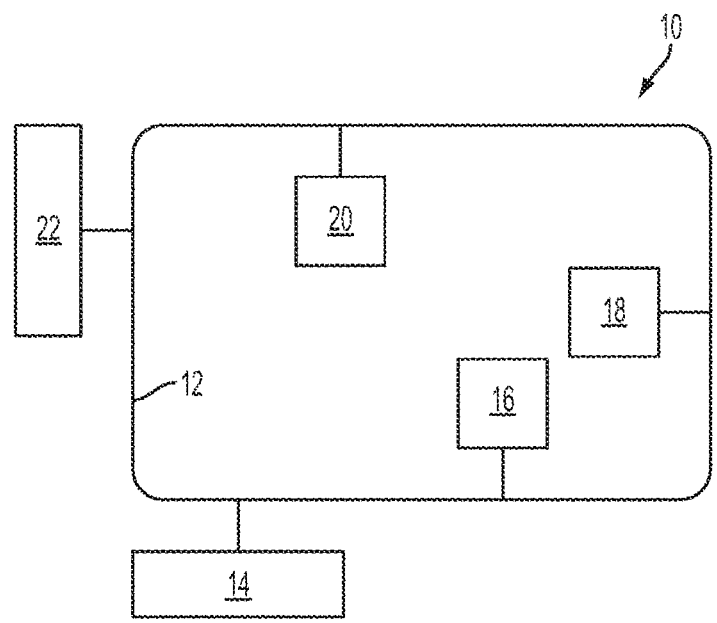
FIG. 15 is a schematic view of a prior art high speed sorting conveyor system.

Referring now to FIGS. 14A through 14D a cross transfer assembly 220*a* of sorter module 410 includes a frame 222, a sorter line zone 412*a* and a cross transfer 230. Frame 222 includes a pair of longitudinal members 224 and a plurality of transverse members 226 for providing rigidity to the frame. Each longitudinal frame member 224 defines a plurality of apertures that are configured to rotatably receive a drive roller 117 and associated idler rollers 118 of the associated sorter line zone 412*a*. In addition to utilizing a first plurality of drive belts 120 engaging a first plurality of annular grooves 122 formed on the various rollers, a second plurality of drive belts 120*a* engages a second plurality of annular grooves 122*a* formed on the opposing ends of various of the idler rollers 118. As shown, the rollers of sorter line zone 412*a* are divided into an inner group of four rollers and two outer groups of two rollers each, for reasons discussed in greater detail below. Note, none of first drive belts 120 are used to connect rollers of the inner group with rollers of the outer group so that drive roller 117, which is in the inner group of rollers, can impart motion on idler rollers 118 of the outer groups. However, as best seen in FIG. 14D, for each pair of second drive belts 120*a*, one second drive belt 120*a* engages an outermost idler roller 118 of the inner roller group, the other second drive belt 120*a* engages an innermost idler roller 118 of the adjacent outer roller groups, and bottom second drive belts 120*a* engage a transfer idler roller 427 that is disposed between and below the connected idler rollers. As such, rotation of the outermost idler rollers of the inner group causes rotation of the transfer idler roller 427 which, in turn, impart rotation on the innermost idler rollers of the outer roller groups.

As shown, cross transfer 230 preferably includes a pair of drive rollers 232, a pair of indexing belts 238 and a plurality of transfer bars 242. Each drive roller 232 is rotatably supported at its opposing ends by a pair of brackets 228 that is mounted to an outer surface of a corresponding frame member 224. Each drive roller 232 includes a toothed drive pulley 234 extending radially outward at each end. Each indexing belt 238 includes a correspondingly toothed inner surface that is engaged by corresponding drive pulleys 234 of the drive rollers 232. As best seen in FIGS. 14C and 14D, brackets 228 are mounted to frame 222 so that corresponding drive pulleys 234 of the opposed drive rollers 232 and, therefore, the indexing belts mounted thereon, are disposed between an outermost roller of the inner roller group and an innermost roller of the corresponding outer roller group. Additionally, as best seen in FIGS. 14B and 14D, drive rollers 232 are further positioned such that an uppermost portion 238*a* of each indexing belt 238 is disposed beneath a plane in which uppermost portions of the adjacent rollers lie. Because the indexing belts 238 are disposed below the uppermost portions of the adjacent rollers, the previously discussed drive transfer rollers 427 and the corresponding second drive belts 120*a* are utilized, rather than first drive belts 120, to impart rotation on the rollers of the outer roller groups, as previously discussed. Further, each indexing belt 238 passes over a pair of idler pulleys 240 that are rotatably mounted to longitudinal frame members 224.

As shown, each transfer bar 242 is affixed to both indexing belts 238 at its opposite ends, such that each transfer bar 242 is parallel to the longitudinal center axis of the corresponding sorter line zone 412*a*. Preferably, as best seen in FIG. 14B, the number and spacing of transfer bars 242 on indexing belts 238 is such that in an at-rest position, transfer bars 242*a* and 242*b* are positioned on each side of the sorter line so that a conveyed tray is receivable therebetween. So positioned, indexing belts 238 are rotatable in either the clockwise (CW) or counter-clockwise (CCW) direction thereby engaging the tray with either transfer bar 242*a* or transfer bar 242*b*, respectively. Continued rotation in the same direction causes either transfer bar 242*a* to slide the tray off of the sorter line and onto a corresponding output conveyor. Upon completion of the tray's transfer, indexing belts 238 come to rest such that two of the three transfer bars 242 are once again properly positioned for the next transfer event. Note, the positioning of transfer bars 242 parallel to the longitudinal center axis of the sorter line helps insure that as the transfer bar engages the flat side of the tray to be moved, the tray will remain properly aligned and not become skewed. An alternate embodiment of cross transfer 230 includes pairs of lugs 244 affixed to indexing belts 238 rather than transfer bars, as shown in FIG. 6E.

To offload a selected tray for delivery, the tray is retrieved from accumulation array 110 (FIG. 1) and placed on main conveyor 100, as previously discussed. The selected tray is then diverted from main conveyor 100 onto infeed line 412 of modular sorter station 400. The tray is moved along subsequent zones of infeed line until reaching the entry point for modular sorter station 400, which in the present example corresponds to the intersection of infeed line 412 and curved portion 461 of recirculation conveyor 460. Prior to depositing the tray on curved portion 461, a sorter PC (not shown), discussed in greater detail below, determines whether or not there is already a tray present on curved portion 461 through information provided by the photo eye that is associated with the curved portion of recirculation conveyor 460. If there is, the tray will remain on the last zone of infeed line 412 until the preceding tray is cleared from curved portion 461.

Additionally, prior to being positioned on first level 411*a* of modular sorter station 400, a camera (not shown) positioned between curved portion 461 and first level 411*a* reads the barcode on the tray which identifies the package and allows the sorter PC, which is a stand alone computer and controls the operations of modular sorter station 400, to inform the host computer system 304 of the tray's arrival at modular sorter station 400. Information regarding the desired offload location, i.e., the desired module output conveyor 416*a*, 416*b*, is then provided by the host computer system 304 to the sorter PC which controls operation of the required conveyor zones within modular sorter station 400 by way of the embedded controllers in each sorter module's control panel 418. The host computer system 304 and sorter PC are networked together with the various system inputs and outputs, such as conveyor zone motors, diverter motors, cross transfer motors, etc., by, for example, Ethernet connections.

After the desired module output conveyor 416*a*, 416*b* is determined, the tray is moved onto the first sorter line zone 412*a* of first level 411*a* by the sorter PC. As shown in FIG. 10, where an end portion of a straight conveyor, such as infeed line 412 is in communication with a curved portion 461 of recirculation conveyor 460, a merge portion 134 (FIG. 7) is disposed between the curved portion and the straight conveyor to facilitate the transfer of objects from one conveyor to the other. The tray is moved to subsequent sorter line zones 412*a* until reaching the one that is adjacent the desired module output conveyor 416*a*, 416*b*, which in the present example is the fourth one on the left side of the sorter station.

Referring additionally to FIGS. 14A through 14D, in the present example, the sorter PC rotates indexing belts of cross transfer assembly 220a such that the transfer bar in its at-rest position adjacent the right hand side of sorter line passes over sorter line zone 412a until it arrives at its at-rest position on the left-hand side of the sorter line. In so doing, the transfer bar engages the tray and slides the tray off of the sorter line and onto module output conveyor 416a. Preferably, each module output conveyor 416a, 416b is angled so that its distal end is lower than its proximal end. As such, gravity assists the movement of each tray to the distal end as the trays pass over idler rollers 118.

Note, in the case that the tray reaches the intended module output conveyor, but the sorter PC determines that the intended output conveyor happens to be full based on input from the photo eyes associated with the proximal end of each module output conveyor, the sorter PC will move the tray along the remainder of the sorter line where it is offloaded onto recirculation conveyor 460. The tray is then transported back to the entry point of the modular sorter station 400, where the sorter PC can determine whether or not the desired output conveyor is partially cleared and therefore able to receive the tray. If the desired output conveyor is available, the sorter PC moves the tray back onto first level 411a for off load. The sorter PC keeps track of the status (full/empty) of each module output conveyor through input from the photo eyes of the sorter station 400.

To conduct the storage and retrieval process, the sorting conveyor system uses the host computer system 304, which is connected via an Ethernet connection directly with the HDSAS PLC 306, via a dedicated Ethernet port, or that communicates with the HDSAS and its processor through connection with a network to which the HDSAS is also connected.

A processor on the computer accesses a computer program from a file system or memory on the computer, or other computer-readable media, to facilitate the storage and retrieval process. Any suitable transitory or non-transitory computer readable medium may be utilized. The computer readable medium may be, for example but not limited to, an electronic, magnetic, optical, electromagnetic, infrared, or semiconductor system, apparatus, or device, such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. In the context of this document, a computer readable medium may be any medium that can contain, store, communicate, or transport the program for use by or in connection with the instruction execution system, apparatus, or device. As indicated above, the HDSAS also has a processor and memory and may be considered a computer within the present description.

The host computer system 304 may also include one or more input devices, output devices or combination input and output devices. The I/O devices may include a keyboard, computer pointing device, or similar means to control operation of applications and interaction features. I/O devices may also include disk drives or devices for reading computer media, including computer-readable or computer-operable instructions.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Figure 13:
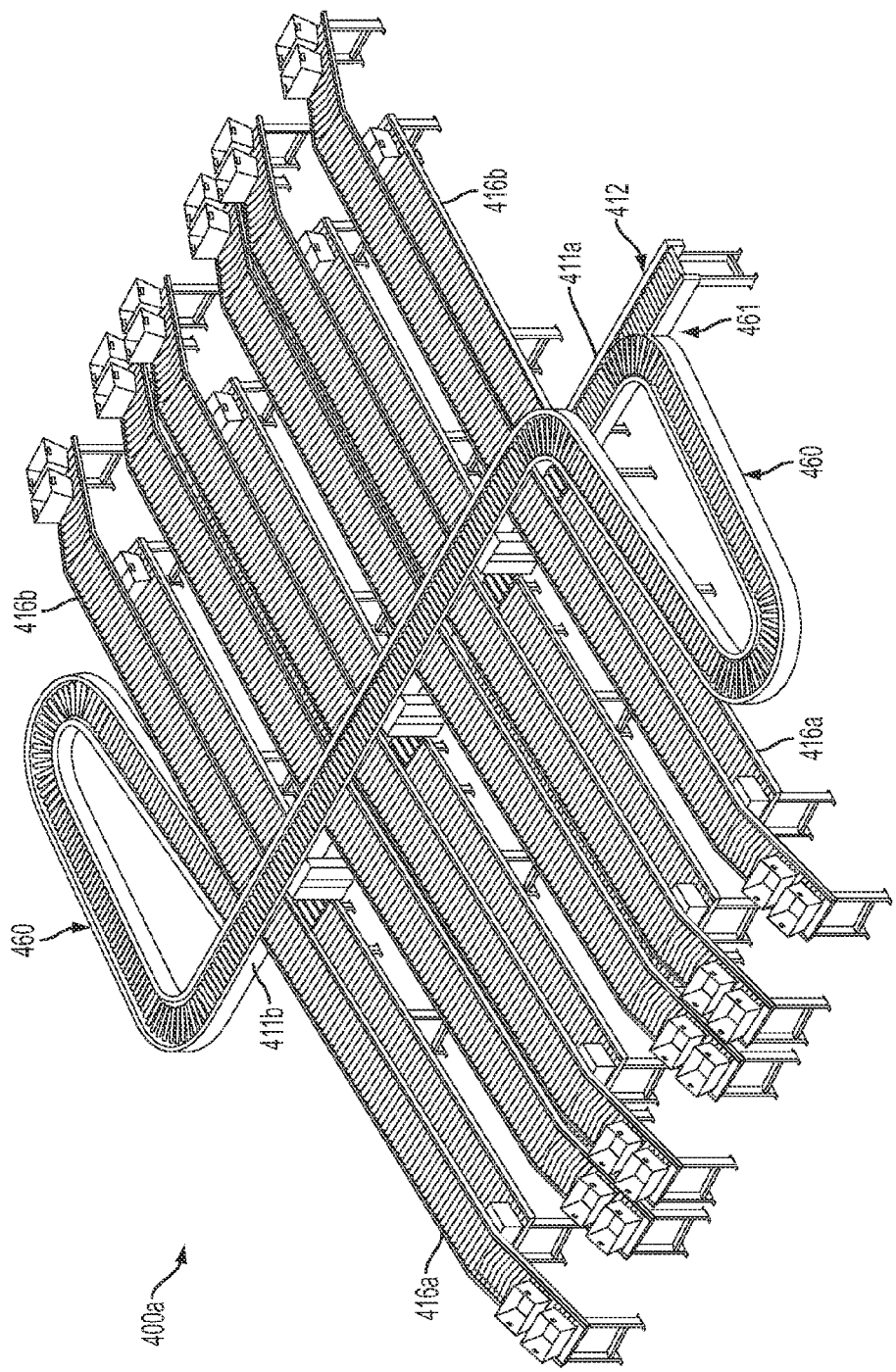
FIG. 13 is a perspective view of an alternate embodiment of a modular sorter station of the sorting conveyor system shown in FIG. 1.

While one or more preferred embodiments of the invention are described above, it should be appreciated by those skilled in the art that various modifications and variations can be made in the present invention without departing from the scope and spirit thereof. For example, as shown in FIG. 13, in an alternate embodiment of a modular sorter station 400a in accordance with the present disclosure, upper and lower levels 411a and 411b of each sorter module 410a are identical to the lower level 411a of the previously discussed embodiment shown in FIGS. 10 and 11. As such, not only is second level 411b able to recirculate objects as previously discussed, objects may be off-loaded on to module output conveyors 416a and 416b, thereby enhancing the off-load capability of the modular sorter station. It is intended that the present invention cover such modifications and variations as come within the scope and spirit of the appended claims and their equivalents.

What is claimed is:

1. A conveyor system for an object, comprising:
 a rack including a first level;
 a first drawer including a drawer frame and being slidably received by the rack;
 an input conveyor disposed on the first level, being moveable with respect to the rack in a first direction of travel, and including at least an input conveyor zone mounted to the drawer frame;
 a first storage conveyor disposed on the first level, being moveable with respect to the rack in a second direction of travel, and including at least a first storage conveyor zone mounted to the drawer frame;
 a second storage conveyor disposed on the first level, being moveable with respect to the rack in a third direction of travel, and including at least a second storage conveyor zone mounted to the drawer frame; and
 a cross transfer assembly disposed on the first level, mounted to the drawer frame, and being movable with respect to the input conveyor in both the second direction of travel and the third direction of travel so that the cross transfer assembly moves the object from the input conveyor onto one of the first storage conveyor and the second storage conveyor,
 wherein the input conveyor is disposed between the first storage conveyor and the second storage conveyor, and the second direction of travel and the third direction of travel are transverse to the first direction of travel.

2. The conveyor system of claim 1, further comprising a first output conveyor, wherein the first storage conveyor is disposed between the first output conveyor and the input conveyor, and the first output conveyor is moveable in a direction of travel that is parallel to the first direction of travel of the input conveyor.

3. The conveyor system of claim 2, further comprising a second output conveyor, wherein the second storage conveyor is disposed between the second output conveyor and the input conveyor, and the second output conveyor is moveable in a direction of travel that is parallel to the first direction of travel of the input conveyor.

4. The conveyor system of claim 3, further comprising:
a spiral feed conveyor having an entry point with the input conveyor so that the spiral feed conveyor places objects on the input conveyor;
a first spiral output conveyor having an exit point with the first output conveyor so that the first output conveyor places objects on the first spiral output conveyor; and
a second spiral output conveyor having an exit point with the second output conveyor so that the second output conveyor places objects on the second spiral output conveyor.

5. The conveyor system of claim 1, further comprising:
a second level on the rack;
a second drawer including a second drawer frame and being slidably received in the rack;
an input conveyor being disposed on the second level, being moveable with respect to the rack in the first direction of travel, and including at least an input conveyor zone mounted to the second drawer frame;
a first storage conveyor being disposed on the second level, being moveable with respect to the rack in the second direction of travel, and including at least a first storage conveyor zone mounted to the second drawer frame;
a second storage conveyor being disposed on the second levels, being moveable with respect to the rack in the third direction of travel, and including at least a second storage conveyor zone mounted to the second drawer frame; and
a cross transfer assembly being disposed on the second level, mounted to the second drawer frame, and being movable with respect to the input conveyor of the second level in both the second direction of travel and the third direction of travel so that the cross transfer assembly of the second level moves an object from the input conveyor of the second level to one of the first storage conveyor and the second storage conveyor of the second level.

6. The conveyor system of claim 5, further comprising a spiral feed conveyor, the spiral feed conveyor having a first entry point with the input conveyor of the first level and a second entry point with the input conveyor of the second level so that the spiral feed conveyor selectively places objects on the input conveyors of the first level and the second level.

7. The conveyor system of claim 1, wherein the first level comprises a plurality of said first drawers.

8. A conveyor system for an object, comprising:
a rack including a first level;
an input conveyor disposed on the first level and being moveable with respect to the rack in a first direction of travel;
a first storage conveyor disposed on the first level and being moveable with respect to the rack in a second direction of travel;
a second storage conveyor disposed on the first level and being moveable with respect to the rack in a third direction of travel;
wherein the input conveyor, first storage conveyor and second storage conveyor are powered roller conveyors, each further comprising a plurality of rollers; and
a cross transfer assembly disposed on the first level and being movable with respect to the input conveyor in both the second direction of travel and the third direction of travel so that the cross transfer assembly moves the object from the input conveyor onto one of the first storage conveyor and the second storage conveyor, wherein the cross transfer assembly comprises
a pair of transfer rollers disposed so that a longitudinal center axis of each transfer roller is parallel to the first direction of travel and respective transfer rollers of the pair are disposed on opposite sides of the input conveyor, and
a pair of indexing belts, an inner surface of each indexing belt being in contact with an outer surface of each transfer roller so that each indexing belt is transverse to the first direction of travel,
wherein at least one of the pair of transfer rollers is a powered roller,
wherein the input conveyor is disposed between the first storage conveyor and the second storage conveyor, and the second direction of travel and the third direction of travel are transverse to the first direction of travel,
wherein each indexing belt is disposed between a pair of adjacent rollers of the input conveyor and an uppermost portion of each indexing belt is disposed below a plane in which an uppermost portion of each adjacent roller lies, and
wherein the cross transfer assembly further comprises a transfer bar having a first end affixed to one belt of the pair of indexing belts and a second end affixed to another belt of the pair of indexing belts, wherein a longitudinal center axis of the transfer bar is parallel to the first direction of travel.

9. The conveyor system of claim 8, wherein both transfer rollers of the pair of transfer rollers are powered rollers.

10. A conveyor system for an object, comprising:
a rack including a first level and a second level, each of the first level and the second level respectively having
a drawer including a drawer frame and being slidably received by the rack;
an input conveyor, being moveable with respect to the rack in a direction of travel that is parallel to a longitudinal center axis of the input conveyor, and including at least an input conveyor zone mounted to the drawer frame;
a first storage conveyor, being moveable with respect to the rack in a direction of travel that is transverse to the longitudinal center axis of the input conveyor, and including at least a first storage conveyor zone mounted to the drawer frame;
a first output conveyor, being moveable with respect to the rack in a direction of travel that is parallel to the longitudinal center axis of the input conveyor, and including at least a first output conveyor zone mounted to the drawer frame; and
a cross transfer assembly, mounted to the drawer frame, being movable with respect to the input conveyor so that the cross transfer assembly moves an object from the input conveyor onto the first storage conveyor,
wherein the first level is disposed above the second level and, at each level, the first storage conveyor is disposed between the input conveyor and the first output conveyor.

11. The conveyor system of claim 10, wherein each of the first level and the second level further comprise a second storage conveyor being moveable with respect to the rack in a direction of travel that is transverse to the longitudinal center axis of the input conveyor, and a second output conveyor, wherein the second storage conveyor is disposed between the second output conveyor and the input conveyor, and the second output conveyor is moveable in a direction of travel that is parallel to the longitudinal center axis of the input conveyor.

12. The conveyor system of claim 11, further comprising:
a spiral feed conveyor having an entry point with the respective input conveyors of the first level and the second level so that the spiral feed conveyor selectively places objects on the respective input conveyors;
a first spiral output conveyor having an exit point with the respective first output conveyors of the first level and the second level so that the first output conveyors place objects on the first spiral output conveyor; and
a second spiral output conveyor having an exit point with the respective second output conveyors of the first level and the second level so that the second output conveyors place objects on the second spiral output conveyor.

13. The conveyor system of claim 10, wherein, at each of the first level and the second level, the cross transfer assembly is disposed between the first storage conveyor and the second storage conveyor.

14. The conveyor system of claim 13, wherein, at each of the first level and the second level, the cross transfer assembly is moveable transverse to the longitudinal center axis of the input conveyor so that the cross transfer assembly moves an object from the input conveyor onto one of the first storage conveyor and second storage conveyor.

15. The conveyor system of claim 10, further comprising a spiral feed conveyor, the spiral feed conveyor having a first entry point with the input conveyor of the first level and a second entry point with the input conveyor of the second level so that the spiral feed conveyor selectively places objects on the input conveyors of the first level and the second level.

16. The conveyor system of claim 10, wherein the input conveyor, first storage conveyor and second storage conveyor are powered roller conveyors, each further comprising a plurality of rollers.

17. A conveyor system for an object, comprising:
a rack including a first level and a second level, each of the first level and the second level respectively having
an input conveyor being moveable with respect to the rack in a direction of travel that is parallel to a longitudinal center axis of the input conveyor;
a first storage conveyor being moveable with respect to the rack in a direction of travel that is transverse to the longitudinal center axis of the input conveyor;
a first output conveyor being moveable with respect to the rack in a direction of travel that is parallel to the longitudinal center axis of the input conveyor; and
a cross transfer assembly being movable with respect to the input conveyor so that the cross transfer assembly moves an object from the input conveyor onto the first storage conveyor,
wherein the first level is disposed above the second level and, at each level, the first storage conveyor is disposed between the input conveyor and the first output conveyor,
wherein each of the cross transfer assemblies of the first level and the second level further comprises
a pair of transfer rollers disposed so that a longitudinal center axis of each transfer roller is parallel to the longitudinal center axis of the input conveyor, the transfer rollers of the pair being respectively disposed on opposite sides of the input conveyor; and
a pair of indexing belts, an inner surface of each indexing belt being in contact with an outer surface of each transfer roller so that each indexing belt extends transverse to the longitudinal center axis of the input conveyor,
wherein at least one of the pair of transfer rollers is a powered roller,
wherein, at each of the first level and the second level, each indexing belt is disposed between a pair of adjacent rollers of the input conveyor and an uppermost portion of each indexing belt is disposed below a plane in which an uppermost portion of each adjacent roller lies, and
further comprising, at each of the first level and the second level, a transfer bar having a first end affixed to one belt of the pair of indexing belts and a second end affixed to another belt of the pair of indexing belts, wherein a longitudinal center axis of the transfer bar is parallel to the longitudinal center axis of the input conveyor.

18. A conveyor system for an object, comprising:
a first conveyor having a pair of adjacent first rollers for moving the object in a first direction of travel; and
a second conveyor having a first belt and at least one projection fixed to an outer surface of the first belt, the first belt being disposed between the first rollers so that an uppermost portion of the first belt is disposed below an uppermost portion of each first roller and the at least one projection extends upwardly beyond the uppermost portion of each first roller,
wherein
the at least one projection is movable in a second direction of travel that is transverse to the first direction of travel,
the second conveyor further comprises a pair of drive rollers, the drive rollers being respectively disposed on opposite sides of the first conveyor, wherein the drive rollers engage an inner surface of the first belt,
the first conveyor further comprises a pair of adjacent second rollers for moving the object in the first direction of travel,
the second conveyor further comprises a second belt disposed between the second rollers so that an uppermost portion of the second belt is disposed below an uppermost portion of each second roller, and
the at least one projection further comprises a bar with a first end fixed to the outer surface of the first belt and a second end fixed to an outer surface of the second belt, the bar being parallel to the first direction of travel.

19. The conveyor system of claim 18, wherein the at least one projection is moveable in a third direction of travel that is transverse to the first direction of travel and opposite the second direction of travel.

20. The conveyor system of claim 18, wherein the at least one projection further comprises a first projection and a second projection, the first and second projections being spaced from each other by a first distance and extending upwardly beyond the uppermost portion of each first roller.

21. The conveyor system of claim 20, wherein the first distance is greater than an overall length of the first rollers.

22. The conveyor system of claim 18, wherein the at least one projection further comprises a second bar with a first end fixed to the outer surface of the first belt and a second end fixed to an outer surface of the second belt, the second bar being parallel to the first direction of travel, the first bar and the second bar being respectively disposed on opposite sides of the first conveyor.

23. A conveyor system for an object, comprising:
a powered roller input conveyor comprising a plurality of rollers and being moveable in a direction of travel that is parallel to a longitudinal center axis of the input conveyor;
a first storage conveyor being moveable in a direction of travel that is transverse to the longitudinal center axis of the input conveyor;

a second storage conveyor being moveable in a direction of travel that is transverse to the longitudinal center axis of the input conveyor;

a first output conveyor being moveable in a direction of travel that is parallel to the longitudinal center axis of the input conveyor;

a second output conveyor moveable in a direction of travel that is parallel to the longitudinal center axis of the input conveyor; and a cross transfer assembly disposed between the first storage conveyor and the second storage conveyor and being movable transverse to the longitudinal center axis of the input conveyor so that the cross transfer assembly moves an object from the input conveyor onto one of the first storage conveyor and the second storage conveyor, wherein the first storage conveyor is disposed between the input conveyor and the first output conveyor and the second storage conveyor is disposed between the input conveyor and the second output conveyor, the cross transfer assembly further comprises a pair of transfer rollers disposed so that a longitudinal center axis of each transfer roller is parallel to the longitudinal center axis of the input conveyor, the transfer rollers of the pair being respectively disposed on opposite sides of the input conveyor, and a pair of indexing belts, an inner surface of each indexing belt being in contact with an outer surface of each transfer roller so that each indexing belt extends transverse to the longitudinal center axis of the input conveyor, at least one of the pair of transfer rollers is a powered roller, each indexing belt is disposed between a pair of adjacent rollers of the input conveyor and an uppermost portion of each indexing belt is disposed below a plane in which an uppermost portion of each adjacent roller lies, and further comprising a transfer bar having a first end affixed to one belt of the pair of indexing belts and a second end affixed to another belt of the pair of indexing belts, wherein a longitudinal center axis of the transfer bar is parallel to the longitudinal center axis of the input conveyor, and a portion of the transfer bar is disposed above the plane in which the uppermost portion of each adjacent roller lies.

24. A conveyor system for an object, comprising:

a rack;

a drawer including a drawer frame and being slidably received by the rack;

an input conveyor, being moveable in a direction of travel that is parallel to a longitudinal center axis of the input conveyor, and including at least an input conveyor zone mounted to the drawer frame;

a storage conveyor, being moveable in a direction of travel that is transverse to the longitudinal center axis of the input conveyor, and including at least a storage conveyor zone mounted to the drawer frame;

an output conveyor, being moveable in a direction of travel that is parallel to the longitudinal center axis of the input conveyor, and including at least an output conveyor zone mounted to the drawer frame; and a cross transfer assembly, mounted to the drawer frame, being movable with respect to the input conveyor so that the cross transfer assembly moves an object from the input conveyor onto the storage conveyor, wherein the storage conveyor is disposed between the input conveyor and the output conveyor.

* * * * *